United States Patent
Mohapatra et al.

(10) Patent No.: US 10,272,860 B2
(45) Date of Patent: Apr. 30, 2019

(54) CRUSHABLE POLYMERIC RAIL EXTENSION, SYSTEMS, AND METHODS OF MAKING AND USING THE SAME

(71) Applicant: SABIC Global Technologies B.V., Bergen op Zoom (NL)

(72) Inventors: Subhransu Sekhar Mohapatra, Bangalore (IN); Krishna Kishore Gumpina, Bangalore (IN); Somasekhar Bobba, Bangalore (IN); Arunachala Parameshwara, Bangalore (IN); Venkatesha Narayanaswamy, Bangalore (IN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 50 days.

(21) Appl. No.: 15/328,318

(22) PCT Filed: Jul. 23, 2015

(86) PCT No.: PCT/IB2015/055599
§ 371 (c)(1),
(2) Date: Jan. 23, 2017

(87) PCT Pub. No.: WO2016/012977
PCT Pub. Date: Jan. 28, 2016

(65) Prior Publication Data
US 2017/0217393 A1    Aug. 3, 2017

Related U.S. Application Data

(60) Provisional application No. 62/102,821, filed on Jan. 13, 2015, provisional application No. 62/028,956, filed on Jul. 25, 2014.

(51) Int. Cl.
*B60R 19/34* (2006.01)
*F16F 7/12* (2006.01)
(Continued)

(52) U.S. Cl.
CPC ............ *B60R 19/34* (2013.01); *F16F 7/12* (2013.01); *B29C 45/0005* (2013.01);
(Continued)

(58) Field of Classification Search
CPC .......... B60R 19/18; B60R 19/26; B60R 19/34
(Continued)

(56) References Cited

U.S. PATENT DOCUMENTS 4,029,350 A * 6/1977 Goupy .................... B60Q 1/26
293/110
5,150,935 A    9/1992 Glance et al.
(Continued)

FOREIGN PATENT DOCUMENTS

CN    1479680 A    3/2004
CN    101939558 A1    1/2011
(Continued)

OTHER PUBLICATIONS

Chinese Patent No. 101939558(A1); Date of Publication: Jan. 5, 2011; Machine Translation; 20 Pages.
(Continued)

*Primary Examiner* — Jason S Daniels
(74) *Attorney, Agent, or Firm* — Cantor Colburn LLP

(57) ABSTRACT

A rail extension system (16), comprising: a vehicle rail (60); a bumper beam (20); a polymeric rail extension (1) comprising: a base (2) extending from one end of the rail extension having vehicle attachment configured to attach to the vehicle rail (60); a front member 4) configured for attachment to the bumper beam (20); a body (5) extending from the base (2) to the front member (4); an aperture (100) extending from the base (2) to the front member (4); a connection member (102) attached to the bumper beam (20) and extending through the aperture (100) to attach to the vehicle rail (60).

14 Claims, 20 Drawing Sheets

(51) Int. Cl.
    *B29C 45/00*    (2006.01)
    *B29C 45/16*    (2006.01)
    *B29L 31/30*    (2006.01)
    *B60R 19/26*    (2006.01)

(52) U.S. Cl.
    CPC ....... *B29C 45/16* (2013.01); *B29L 2031/3044* (2013.01); *B60R 2019/264* (2013.01)

(58) Field of Classification Search
    USPC .................................................. 293/132, 133
    See application file for complete search history.

(56)    References Cited

U.S. PATENT DOCUMENTS

| | | | |
|---|---|---|---|
| 5,273,330 A * | 12/1993 | Petry ...................... | B60R 19/26 293/132 |
| 6,547,295 B2 * | 4/2003 | Vismara .................. | B60R 19/18 293/120 |
| 8,348,033 B2 * | 1/2013 | Hayashi .................. | B60R 19/34 188/377 |
| 8,430,437 B2 | 4/2013 | Asakawa et al. | |
| 8,469,417 B2 | 6/2013 | Di Modugno | |
| 8,474,583 B2 | 7/2013 | Nagwanshi et al. | |
| 8,905,444 B2 * | 12/2014 | Zannier ................... | F16F 7/121 293/132 |
| 9,067,550 B2 * | 6/2015 | Nagwanshi ............. | B60R 19/34 |
| 9,469,264 B2 | 10/2016 | Nagwanshi et al. | |
| 2010/0244472 A1 | 9/2010 | Gonin et al. | |
| 2011/0316307 A1 | 12/2011 | Di Modugno | |
| 2015/0291112 A1 | 10/2015 | Nagwanshi et al. | |
| 2017/0158252 A1 | 6/2017 | Milne et al. | |

FOREIGN PATENT DOCUMENTS

| | | |
|---|---|---|
| EP | 1104857 A1 | 6/2001 |
| EP | 2380782 A1 | 10/2011 |
| EP | 2889187 A2 | 7/2015 |
| GB | 286937 A | 10/2003 |
| JP | 0454336 | 2/1992 |
| JP | 2014004973 A | 1/2014 |
| WO | 2005105554 A1 | 11/2005 |
| WO | 2008073522 A1 | 6/2008 |
| WO | 2010103449 A1 | 9/2010 |
| WO | 2010109405 A1 | 9/2010 |
| WO | 2012014091 A1 | 2/2012 |
| WO | 2012040826 A1 | 4/2012 |
| WO | 2012042396 A1 | 4/2012 |
| WO | 2013007386 A1 | 1/2013 |
| WO | 2014113580 A1 | 7/2014 |

OTHER PUBLICATIONS

Chinese Patent No. 1479680(A); Date of Publication: Mar. 3, 2004; Machine Translation; 14 Pages.
European Patent No. 2380782(A1); Date of Publication: Oct. 26, 2011; Machine Translation; 12 Pages.
International Publication No. 2013007386(A1); Date of Publication: Jan. 17, 2013;Machine Translation; 10 Pages.
International Search Report for International Application No: PCT/IB2015/055599; International Filing Date: Jul. 23, 2015; dated Jan. 12, 2016; 8 Pages.
Korean Patent No. 1020090107691; Date of Publication: Aug. 10, 2010; Machine Translation; 9 Pages.
Korean Patent No. 1020130056472(A); Date of Publication: May 30, 2013; Machine Translation; 10 Pages.
Korean Patent No. 1020130065136(A); Date of Publication: Jun. 19, 2013; Machine Translation; 11 Pages.
U.S. Appl. No. 13/745,180; filed Oct. 18, 2013; "Polymer, Energy Absorber Rail Extension, Methods of Making and Vehicles Using the Same"; Available in Image File Wrapper.
Written Opinion of the International Searching Authority for International Application No. PCT/IB2015/055599; International Filing Date: Jul. 23, 2015; dated Jan. 12, 2016; 10 Pages.
International Search Report for International Application No. PCT/IB2017/058459; International Filing Date: Dec. 28, 2017; dated Jun. 15, 2018; 6 Pages.
Written Opinion of the International Searching Authority for International Application No. PCT/IB2017/058459; International Filing Date: Dec. 28, 2017; dated Jun. 15, 2018; 7 Pages.

* cited by examiner

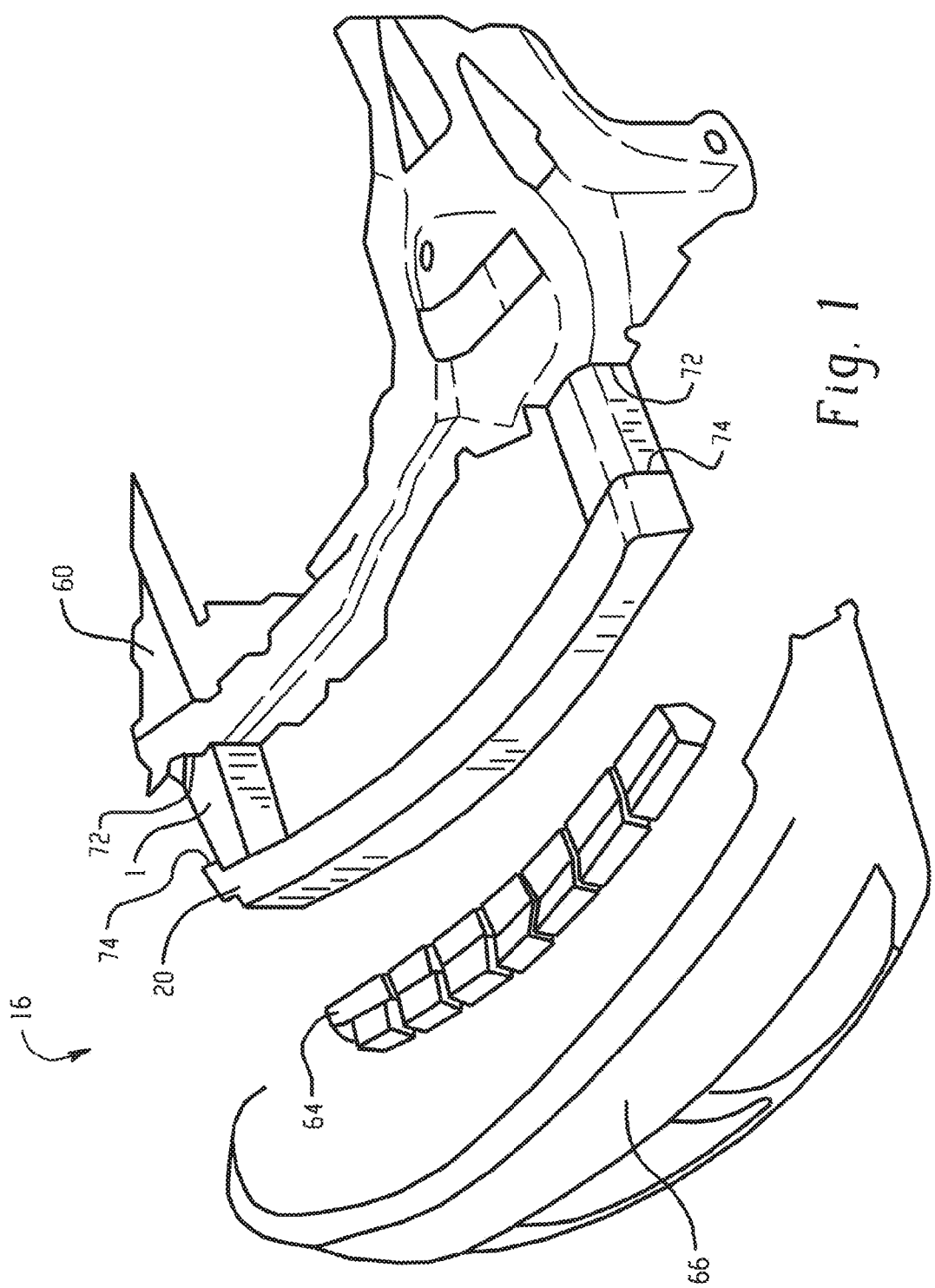

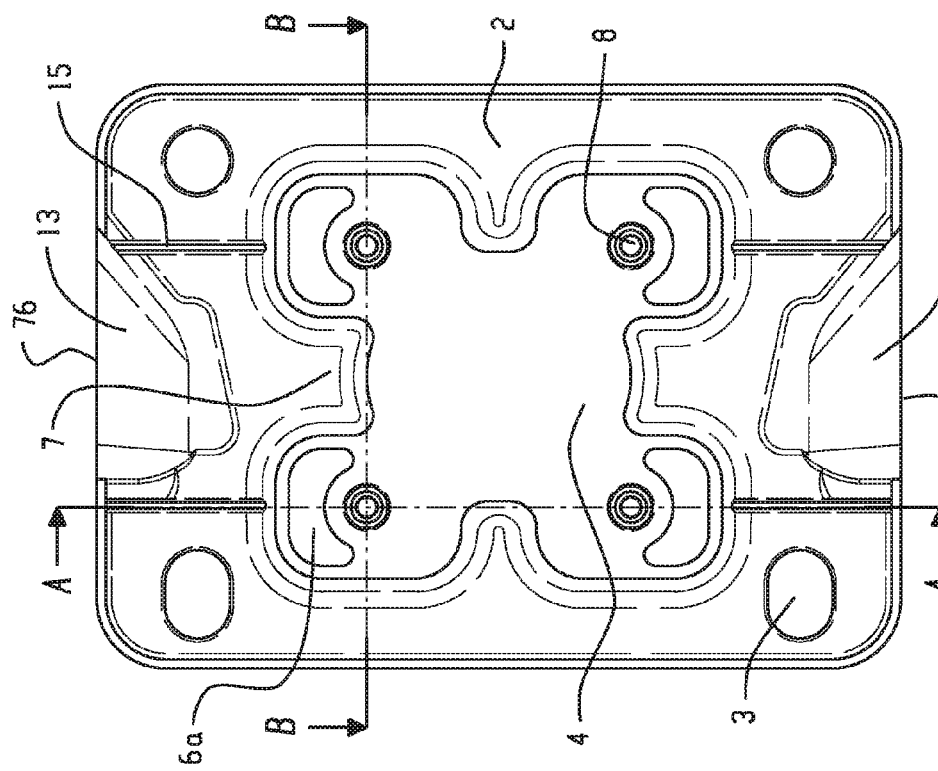
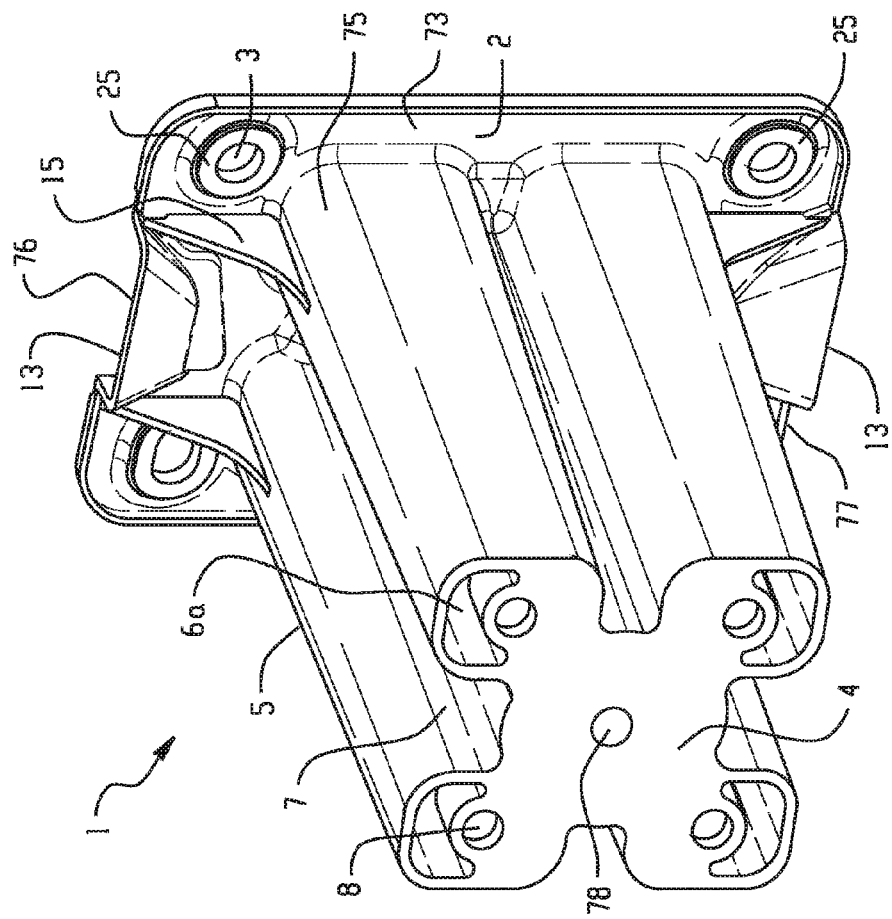

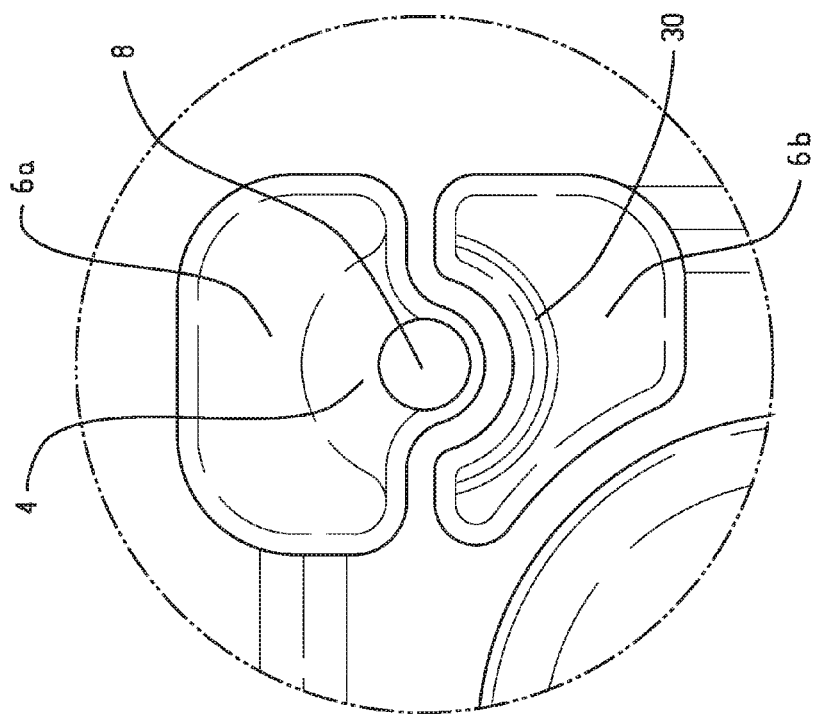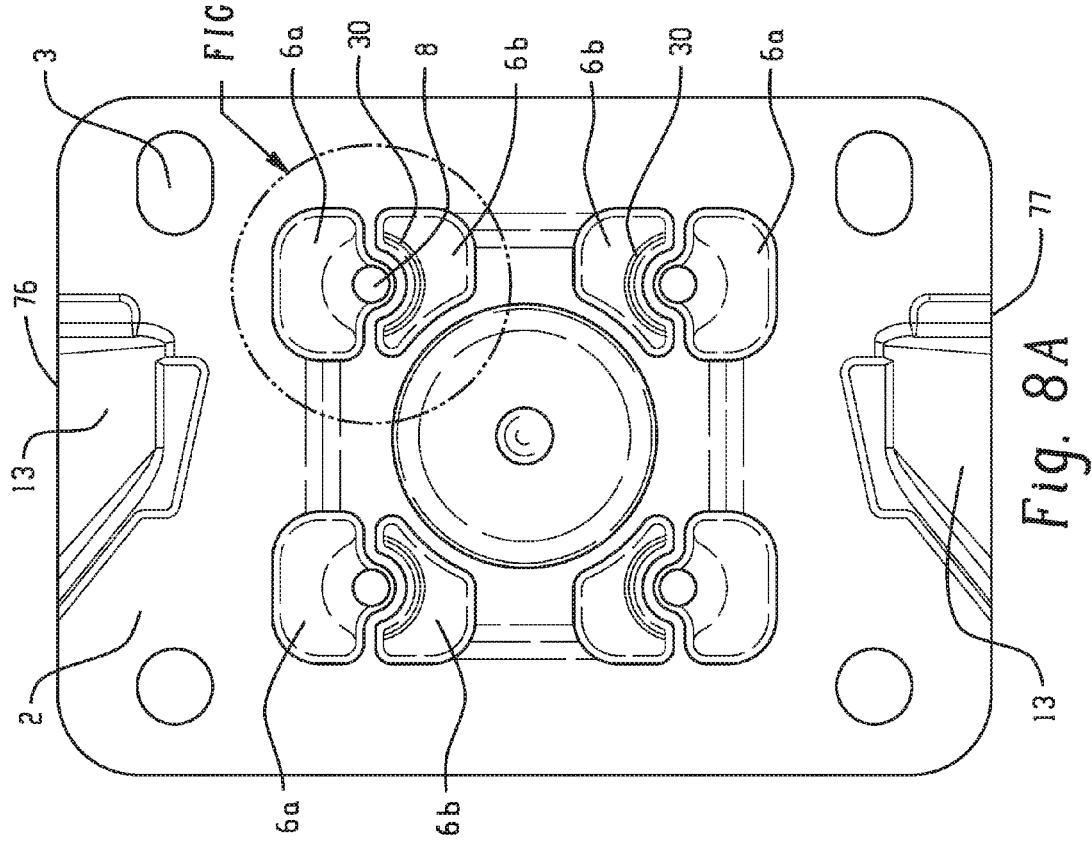

CRUSHABLE POLYMERIC RAIL EXTENSION, SYSTEMS, AND METHODS OF MAKING AND USING THE SAME

CROSS REFERENCE TO RELATED APPLICATIONS

This application is a 371 of International Application No PCT/IB2015/055599, filed Jul 23, 2015, which claims the benefit of Provisional Application No. 62/102,821, filed Jan. 13, 2015, and Provisional Application No. 62/028,956, filed Jul 25, 2014, all of which are incorporated by reference in their entirety herein.

BACKGROUND

Bumper systems generally extend widthwise, or transversely, across the front and rear of a vehicle and are mounted to rails that extend in a lengthwise direction. Many bumper assemblies for an automotive vehicle include a bumper beam and an injection molded energy absorber secured to the bumper beam with a fascia covering the energy absorber. The system including one or more members that connect the bumper beam to the vehicle chassis/frame is called the rail extension system. Beneficial energy absorbing bumper systems achieve high efficiency by building load quickly to just under the load limit of the rails and maintain that load constant until the impact energy has been dissipated. There is always a need to develop low cost, lightweight, and high performance energy absorbing systems that will deform and absorb impact energy to ensure a good vehicle safety rating and reduce vehicle damage in low speed collisions. Different components due to their inherent geometry and assembly requirements need different energy absorber designs to satisfy the impact criteria. Therefore, the automotive industry is continually seeking economic solutions to improve the overall safety rating of a vehicle. Hence, there is a continual need to provide a solution that would reduce vehicle damage and/or enhance a vehicle safety rating.

One such component can be a rail extension, which attaches the bumper system to the rails. An important aspect to be considered for a rail extension is the energy absorbed within the space available between the rail and bumper system. Depending upon the space available for a rail extension, the size and performance of the rail extension can vary. For example, a small space with a short rail extension can result in inadequate energy absorption. In addition, a large space with a long rail extension can result in unstable buckling instead of progressive crushing, which can lead to low energy absorption.

Polymeric rail extensions can suffer from a reduction in performance due to high temperatures. In addition, polymeric rail extensions can be damaged during a towing operation. Furthermore, polymeric rail extensions are limited in the materials that are available for electrophoretic deposition (e.g., e-coating). For example, only conductive polymeric materials are available for the e-coating process. In addition, for high speed crashes, polymeric rail extensions may not absorb similar energy levels as a metal rail extension. Rail extensions can also be limited by the method of manufacture. For example, injection molding of long part lengths prevents the inclusion of a generous draft angle. In addition, tool ejection becomes a challenge when using injection molding. Thus, it is difficult to provide structurally suitable reinforcements in specific areas within the rail extension when using injection molding techniques. As such, a need exists for a rail extension system that can perform at high temperatures and during towing operations. In addition, a need exists for a rail extension system that is not limited by material constraints. Finally, a need exists for a rail extension and a method of manufacture that can reduce the tooling costs and core length while allowing for the inclusion of crush initiators and reinforcing.

Vehicle rail extensions can slip against the bumper beam due to inadequate engagement resulting in an inefficient absorption of energy. In addition, bumper beams with a "B-shaped" cross section can clash on impact, resulting in the upper portion and lower portion crushing improperly and reducing impact absorption. As such, a need exists for a rail extension system that can reduce the unstable buckling and slippage of the rail extension and prevent clashing in order to increase the overall energy absorption of the system.

BRIEF DESCRIPTION

Disclosed, in various embodiments, are rail extensions, rail extension systems, and methods for making and using the same.

A rail extension includes: a base extending from one end of the rail extension, wherein the base includes vehicle rail attachments configured to attach to a vehicle rail; a front member configured for attachment to a bumper beam; a body extending from the base and toward the front member, wherein the base comprises cells formed by cell walls extending along at least a portion of a length of the body from the base toward the front member and forming cavities therethrough; open channels formed on each side of the body, wherein the open channels are defined by walls of adjacent cells; wherein the front member comprises a plurality of beam attachments that extend from the front member towards the base; and beam attachment inserts located within the beam attachments.

A rail extension system, includes: a vehicle rail; a bumper beam; a polymeric rail extension attached to the vehicle rail on an end and attached to the bumper beam on another end, wherein the polymeric rail extension comprises: a base extending from one end of the rail extension, wherein the base includes vehicle rail attachments configured to attach to the vehicle rail; a front member configured for attachment to the bumper beam; a body extending from the base to the front member; an aperture extending through the base to the front member; and a connection member attached to the bumper beam and extending through the aperture configured to attach the rail extension to the vehicle rail.

A method of forming a rail extension, includes: molding a first portion; molding a second portion; and joining the first portion and the second portion; wherein the first portion and the second portion are symmetrical about an axis of the rail extension; wherein the first portion and the second portion comprise a base extending from one end of the rail extension having vehicle attachment configured to attach to a vehicle rail; a front member configured for attachment to a bumper beam; and a body extending from the base to the front member.

A rail extension, includes: a base extending from an end of the rail extension, wherein the base includes vehicle rail attachments configured to attach to a vehicle rail; a front member configured for attachment to a bumper beam; a body extending from the base to the front member; wherein the body comprises reinforcing members; wherein the body comprises a first polymeric material; wherein the reinforcing members comprise a second polymeric material. The above described and other features are exemplified by the following figures and detailed description.

BRIEF DESCRIPTION OF THE DRAWINGS

The following is a brief description of the drawings wherein like elements are numbered alike and which are presented for the purposes of illustrating the exemplary embodiments disclosed herein and not for the purposes of limiting the same.

FIG. 1 is an exploded view of a vehicle rail extension system.

FIG. 4 is an isometric front view of a polymeric rail extension with a metallic or non-metallic rail attachment insert.

FIG. 5 is a front view of the polymeric rail extension of FIGS. 1 and 2.

FIG. 8A is a rear view of a polymeric rail extension.

FIG. 8B is an expanded view of the circled area in FIG. 8A.

DETAILED DESCRIPTION

Figure 3:
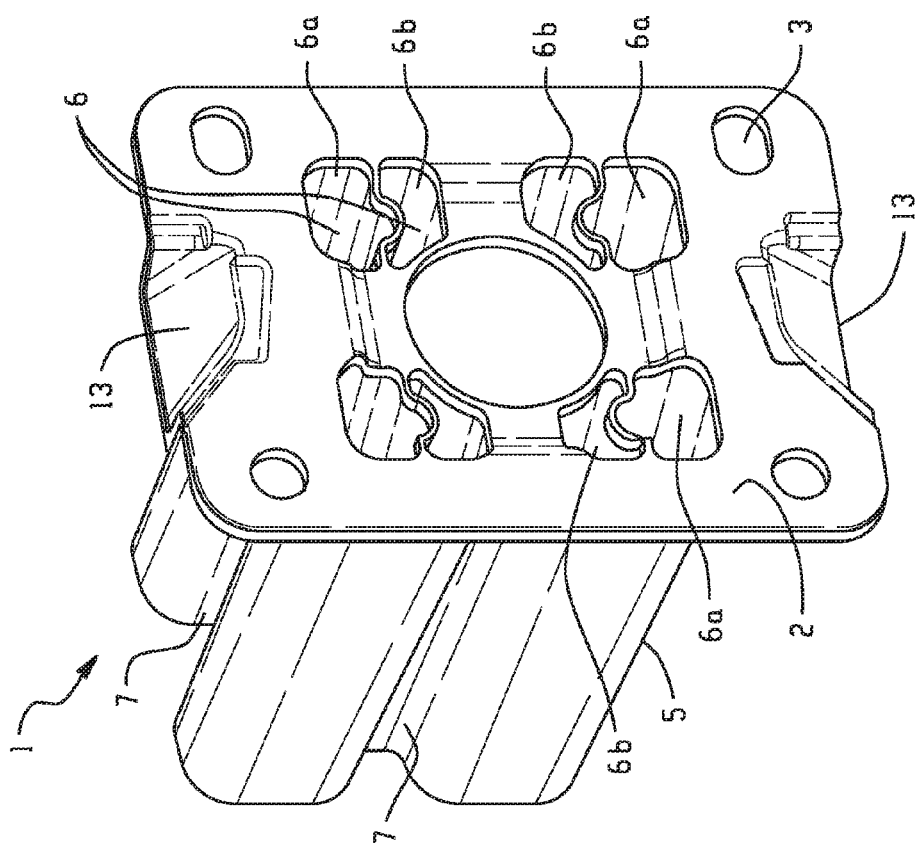
FIG. 3 is an isometric rear view of the polymeric rail extension of FIG. 2.

Disclosed herein, in various embodiments, are polymeric rail extensions and rail extension systems which can be used in conjunction with vehicle components (e.g., a bumper beam and vehicle rail), to minimize the damage suffered during an impact. The polymeric rail extensions can include reinforcing members, shells, and outer layers to improve impact performance. The rail extensions can be symmetrical about a horizontal or vertical axis passing through the center of the rail extension to reduce tooling costs. The polymeric rail extension systems can include a metallic connection member to improve impact performance, enable low towing, and improve high temperature performance. The polymeric rail extensions can include a plate to prevent clashing (e.g., collision of the upper and lower portions) of the bumper beam during impact. In addition, the polymeric rail extensions can include a plate to prevent slippage during impact. The rail extensions can be symmetrical about a horizontal axis passing through the center of the rail extension to enable the rail extension to be used on either side of the vehicle.

The energy absorption section of the extensions are desirably configured to, during impact, maintain a substantially constant force (e.g., will vary by less than or equal to 20%). In other words, if the desired constant force is 100 kiloNewtons (kN), the variation will not exceed 80 kN to 120 kN. It is also noted, that, desirably, during an impact, the energy absorption section imparts a force that exceeds the constant force (e.g., the maximum desired force) by less than or equal to 20%. The energy absorption section imparts a force that exceeds the constant force by less than or equal to 20%. The energy absorption section imparts a force that exceeds the constant force by less than or equal to 10%. The energy absorption section imparts a force that exceeds the constant force by less than or equal to 5%. In other words, if the desired constant force is 100 kN, desirably, during an impact, the energy absorption section imparts a force that is less than or equal to 120 kN. The energy absorption section imparts a force that is less than or equal to 110 kN. The energy absorption section imparts a force that is less than or equal to 105 kN. It is understood that the forces exerted by the energy absorption section are exerted during an impact sufficient to crush the energy absorption section, until the energy absorption section is crushed.

In addition to maintaining a substantially constant force during crushing, the rail extension desirably crushes completely and does not exceed a force during crushing over the force limit for the vehicle. The minimum force on the rail extensions that will initiate crushing is dependent upon the strength of the rails. Generally, the minimum force to initiate crushing is greater than or equal to 60 kN, for example, greater than or equal to 70 kN, for example, greater than or equal to 80 kN. In other words, the force during impact is maintained below the force limit of the rails so that the rails do not fail or deform before the rail extensions fully crush.

The rail extensions can include a base, a body, and a front member. The base can be configured for attachment to a vehicle rail. The body can extend from the base to the front member. The base, body, and front member can be a unitary structure produced through an injection molding process. As described herein, unitary refers to a structure wherein all components are molded simultaneously. For example, the base, body, and front member can be molded simultaneously to form a unity structure. The body can include cells defined by cell walls. Channels can be located on the exterior of the body between the cells. For example, the cell walls can form portions of a 3-sided channel that travels the length of the body from the front member to the base. The channels can assist in ensuring proper crushing of the rail extension.

An aperture can extend through the base, body, and front member. The aperture can be sized to accommodate a connection member. The connection member can be metallic, carbon composite, or a combination including at least one of the foregoing. The connection member can be directly attached to the bumper beam, for example, mechanically or chemically attached. For example, the connection member can be welded, riveted, bolted, or adhesively joined to the bumper beam. Optionally, the connection member can be attached to a plate attached to the bumper beam. The connection member can include any cross-sectional geometry. For example, the connection member can have a round cross-section (e.g., a tube having a geometric shape including, but not limited to, circular, oval, elliptical, pentagonal, hexagonal, heptagonal, octagonal, nonagonal, decagonal, etc.). The connection member can include one or more crush initiators. The crush initiator can include holes, depressions, areas having thinned walls, grooves, and the like. For example, the crush initiator can include grooves having a "U-shaped," "V-shaped," semi-spherical shape, or other polygonal shape. The crush initiators can be located at regular intervals along the body to induce balanced crushing on all sides. In the alternative, the crush initiators can be located only at specific target areas in order to induce crushing along a predetermined path. The connection member can include one or more beam attachments that extend radially from the connection member between the front member and the bumper beam and align with attachments on the front member and/or the bumper beam.

The vehicle rail can include a rail attachment plate for connection to the rail extensions and/or the connection member, e.g., via mechanical or chemical attachment. The rail attachment plate can include a rail attachment insert. The rail attachment insert can include internal threading to accommodate a fastener (e.g., screw, bolt, and the like) for attachment to the connection member. For example, the rail attachment insert can include a nut that is welded to the rail attachment plate.

The rail extension can be symmetrical about a horizontal axis passing through the center of the rail extension. For example, from a frontal view, the rail extension can be symmetrical on a top half and a bottom half. In the alternative, the rail extension can be symmetrical along a vertical axis passing through the center of the rail extension (e.g., a left half and a right half). To facilitate the joining of a first half and a second half, attachment features, such as protrusions and recesses, tongue and groove, snap-fit, etc., can be formed on an outer surface of each half (e.g., where the two halves are to be joined). The attachment features can include a complementary geometry, such as protrusions and recesses and the like. The symmetry of the rail extension provides an advantage in that only a single rail extension design has to be manufactured for both the right hand and left hand sides of the bumper beam (e.g., passenger and driver side). Thus, the symmetrical rail extension eliminates the need for tooling and equipment to manufacture multiple components with different geometries, e.g., a left component and a right component. Accordingly, significant costs can be eliminated by the symmetrical rail extension.

The base can extend perpendicular to the body. The base can include one or more ribs that can extend from the base to a portion of the body. The ribs can be of any shape (e.g., rectangular, triangular, trapezoidal, and the like). The ribs can be structured to provide additional support to the body. For example, the ribs can be placed in a particular location to provide for a controlled crushing direction.

The base can include attachments facilitating attachment to a vehicle rail. The attachments can be mechanical or chemical in nature, e.g., the attachments can be openings for accommodating a fastener (e.g., bolt, screw, and the like). The attachments can be attached through various processes (e.g., vibration welding, adhesive, and the like). The attachments can be of any shape. For example, the attachments can be round, elliptical, square, rectangular, or a combination comprising at least one of the foregoing. An insert can be optionally located within the attachment. The insert can include a metallic material, polymeric material, or a combination of metallic and polymeric materials. The insert can advantageously add mechanical strength to the attachment opening.

The front member can be formed integrally with the body and base to form a unitary structure. The front member can be perpendicular to the body. The front member can form an angle of 90° to 170° with the longitudinal axis of the body. Thus, the front member can conform to a non-linear bumper beam. For example, the front member can be angled to accommodate a curved bumper beam. The front member can include one or more beam attachments. The beam attachments can extend from the front member towards the base. The beam attachments can extend from the front member to the base to facilitate the inclusion of a beam attachment insert. For example, the beam attachment can include a hollow passage that travels from the front member to the base. Thus, the beam attachment insert can be positioned through the base into the hollow passage and abut the front member within the beam attachment. The beam attachment insert can be included within the beam attachments. The beam attachment insert can include a metallic material, polymeric material, or a combination of metallic and polymeric materials. The beam attachment insert can include internal threading. Thus, a screw can be used to attach the front member (and optional plate) to the bumper beam. The front member can include one or more tabs that extend outwardly from the front member to cover a portion of the channels. The tabs can include the beam attachments.

The body of the rail extension can include one or more crush initiators. The crush initiator can include holes, depressions, areas having thinned walls, grooves, and the like. For example, the crush initiator can include grooves having a "U-shaped," "V-shaped," semi-spherical shape, or other polygonal shape. The crush initiators can be located at regular intervals along the body to induce balanced crushing on all sides. In the alternative, the crush initiators can be located only at specific target areas in order to induce crushing along a predetermined path. For example, the crush initiators can be located only on one side of the rail extension in order to direct crushing toward that side of the rail extension.

The rail extensions can have multiple cells. The cells can be any polygonal or rounded shape, such as circular, oval, square, rectangular, triangular, diamond, pentagonal, hexagonal, heptagonal, and octagonal geometries as well as combinations comprising at least one of the foregoing geometries. Structures wherein the lengths of the sides are equal (besides a difference caused by the curvature of the angle formed by adjacent sides) can be useful in obtaining the desired crush characteristics. In other words, substantially square cells having rounded or 90 degree corners can be useful.

Further tuning of the crush characteristics can be attained by beveling the outermost cells of the extension on two opposing sides to form chamfered cells. The beveling can be at an angle from the front member of greater than 0° to 60°. The beveling can be at an angle from the front member of 10° to 45°. The beveling can be at an angle from the front member of 15° to 35°. The number of chamfered cells can be dependent upon the maximum force that can be exerted during a crash. Beveling cell(s) reduces the number of cells in physical contact with the bumper and therefore reduces the initial force attained during an impact. The specific angle desired for a particular design can be determined by measuring the force transferred to the rails versus displacement upon a frontal crash, to determine if the maximum force is exceeded. As the angle increases, the initial force peak decreases.

All or some of the cells can travel the full length of the rail extension (e.g., from the base to the front member or face). In addition, some cells can travel only a portion of the length of the rail extension. For example, some cells can travel less than 75% of the distance from the base to the front member. Some cells can travel less than 50% of the distance from the base to the front member. The cells can have a cell wall geometry that progressively varies (e.g., becomes thicker or thinner) toward the base. The cells can have a cross-sectional shape that varies (e.g., increases or decreases) in area from the front member to the base. For example, the cells can have a geometry where the cells are narrowest toward the front member and widest at the base. In the alternative, the cells can have constant cross-sectional shape from the front member to the base.

All or some of the cells can have a stepped geometry. In other words, the cells can increase in cross-sectional area from the front member toward the base in incremental steps. Internal portions of the cells can include one or more ribs to add structural support. For example, when a stepped geometry is employed, an internal rib can join one step to the next within the cell structure. Thus, the rail extension can progressively dissipate a portion of the kinetic energy through plastic deformation and a programmed collapse starting from the front member to the base.

The rail extension can include a plurality of reinforcement members. The reinforcement members can vary in number from the base to the front member. For example, the base can include more reinforcement members than the front member. In addition, the type of reinforcement member can also vary from the base to the front member. For example, the base can include an "X-shaped" rib structure, and the front member can include a simple vertical or horizontal rib. Thus, varying the type and number of reinforcement structures within the body of the rail extension allows for tuning the stiffness of the body.

A plate can be attached to the front member and can be configured to attach to a bumper beam. The plate can be metallic, polymeric, or a combination of metallic and polymeric, e.g., a hybrid of polymeric/metallic material. The plate can include an anti-clash member that protrudes from the plate away in a direction away from the base. The anti-clash member can have a dimension that fits within a recess in the beam. For example, the beam can include a "B-shaped" cross section and the anti-clash member can prevent the upper portion of the beam from clashing (e.g., colliding with or impacting) with the lower portion of the beam. Thus, the beam can crush properly and energy absorption of the system can be improved. The plate can include an anti-climb member that protrudes from the plate toward the base. The anti-climb member can be dimensioned to fit within one or more cells of the rail extension, preventing slippage between the bumper beam and the rail extension. By preventing slippage during impact, the anti-climb member can increase the impact absorption of the rail extension system. The plate can be attached to the rail extension and subsequently joined to the bumper beam through welding, bolted joints, screwed joints or other fasteners.

The material of the rail extension can be any polymeric material or combination of polymeric materials that can be formed into the desired shape and provide the desired properties. Examples of polymeric materials include thermoplastic materials as well as combinations of thermoplastic materials elastomeric material, and/or thermoset materials. Possible thermoplastic materials include polybutylene terephthalate (PBT); acrylonitrile-butadiene-styrene (ABS); polycarbonate; polycarbonate/PBT blends; polycarbonate/ABS blends; copolycarbonate-polyesters; acrylic-styrene-acrylonitrile (ASA); acrylonitrile-(ethylene-polypropylene diamine modified)-styrene (AES); phenylene ether resins; blends of polyphenylene ether/polyamide; polyamides; phenylene sulfide resins; polyvinyl chloride PVC; high impact polystyrene (HIPS); low/high density polyethylene (L/HDPE); polypropylene (PP); expanded polypropylene (EPP); and thermoplastic olefins (TPO). For example, the polymer can comprise XENOY™ resin, and/or NORYL™ GTX resin, which are both commercially available from SABIC's Innovative Plastics business. The polymer can optionally be reinforced, e.g., with fibers, particles, flakes, as well as combinations comprising at least one of the foregoing. For example, glass fibers, carbon fibers, and combinations comprising at least one of the foregoing. For example, the plastic insert can be formed from STAMAX™ materials, a long glass fiber reinforced polypropylene commercially available from SABIC SABIC's Innovative Plastics business. The extension can also be made from combinations comprising at least one of any of the above-described materials and/or reinforcements, e.g., a combination with a thermoset material.

The rail extension can include multiple materials. For example, the body can include a first polymeric material. For example, the body can include polycarbonate, polyamide, polyphenylene ether, polybutylene terephthalate, polyethylene terephthalate, and combinations including at least one of the foregoing. The first polymeric material can include less than or equal to 60% of a reinforcement material. The first polymeric material can be free from reinforcement material (e.g., fillers, fibers, and the like), which can facilitate the use of an e-coating process for the rail extension.

Reinforcement materials can include any fillers typically used in the conventional compounding of polymers and thermoplastics can also be included in the masterbatch for dispersion into the polymeric matrix resin. Examples of such fillers well known in the art include those described in "Plastic Additives Handbook, 5th Edition" Hans Zweifel, Ed, Carl Hanser Verlag Publishers, Munich, 2001. Non limiting examples of fillers include silica powder, such as fused silica and crystalline silica; boron-nitride powder and boron-silicate powders for obtaining cured products having low dielectric constant and low dielectric loss tangent; alumina, and magnesium oxide (or magnesia) for high temperature conductivity; and fillers, such as wollastonite including surface treated wollastonite, calcium sulfate (as its anhydride, dihydrate or trihydrate), calcium carbonate including chalk, limestone, marble and synthetic, precipitated calcium carbonates, generally in the form of a ground particulates; talc, including fibrous, modular, needle shaped, and lamellar talc; glass spheres, both hollow and solid; kaolin, including hard, soft, calcined kaolin, and kaolin comprising various coatings known in the art to facilitate compatibility with the polymeric matrix resin; mica, feldspar, silicate spheres, flue dust, cenospheres, fillite, aluminosilicate (armospheres), natural silica sand, quartz, quartzite, perlite, tripoli, diatomaceous earth, synthetic silica, and the like. All of the above fillers may be coated with a layer of metallic material to facilitate conductivity or surface treated with silanes to improve adhesion and dispersion with the polymeric matrix resin. Glass fibers, including textile glass fibers such as E, A, C, ECR, R, S, D, and NE glasses and quartz, and the like may also be added into the masterbatch. In addition, organic reinforcing fibrous fillers may also be including, organic polymers capable of forming fibers.

An outer shell can be located around at least a portion to the rail extension and can include a material that is different from or the same as the first and/or second polymeric material. For example, the outer shell can include a metallic material, carbon fiber reinforced polymeric material, glass fiber reinforced polymeric material, and combinations including at least one of the foregoing. An outer layer comprising the first or second polymeric material can be located on an external surface of the outer shell.

A method of making a rail extension can include molding a first portion and second portion. The first and second portions can be identical (e.g., made from the same mold cavity). In addition, first and second portions can be symmetrical about a vertical or horizontal axis. The first and second portions can include a base, body, and front member. In addition, the first and second portions can include one or more reinforcement members. Molding and joining identical mold portions can advantageously reduce tooling costs and can allow customization of the stiffness of the rail extension. For example, reinforcing members can be molded within the first and second portion. The reinforcing members can be varied in both stiffness and geometry. For example, the reinforcing members can be made less stiff at the front member and can have a progressively greater stiffness toward the base. An outer shell can be overmolded onto the first and second portions. An additional outer layer can be formed over the outer shell. For example, the outer layer can be overmolded onto the outer shell. The first and second portions can be joined through chemical and/or mechanical attachments, e.g., adhesive, vibration welding, and other similar processes.

The rail extensions described herein can be formed through an additive manufacturing process. For example, a rail extension can be formed through Material Extrusion, Fused Deposition Modeling (FDM) or Fused Filament Fabrication (FFF), Selective Laser Sintering (SLS), Direct Metal Laser Sintering (DMLS), Electron Beam Freeform Fabrication (EBF$^3$), Electron Beam Melting (EBM), Laminated Object Manufacturing (LOM), Stereolithography (SLA), and Digital Light Processing (DLP).

The overall size, e.g., the specific dimensions of the rail extension will depend upon the particular vehicle, the desired crush characteristics, and the space available. For example, the length (1), height (h), and width (w) of the rail extension, will depend upon the amount of space available between the rail and the bumper beam of the vehicle as well as crush characteristics (e.g., desired displacement, force). The design of the cells, the angle and existence of chamfered section, and the thickness of the cell walls will depend upon the desired crush characteristics (e.g., maximum force exerted by the rail extension during an impact (e.g., while crushing)). The length, l, of the rail extension can be less than or equal to 300 mm, for example, 50 mm to 250 mm, and for example 100 mm to 200 mm (e.g., 150 mm). The width, w, of the energy absorbing device can be less than or equal to 200 mm, for example, 20 mm to 150 mm, and for example 40 mm to 100 mm. The height, h, of the energy absorbing device can be less than or equal to 300 mm, for example, 60 mm to 200 mm, and for example 80 mm to 150 mm. The length is greater than or equal to the height which is greater than or equal to the width. The length, height, and width measurements are the broadest measurement in the specified direction, excluding vehicle attachment tabs. The thickness of the cell walls can be up to 7.0 mm, for example, 2.0 mm to 6.0 mm, and for example, 3.0 mm to 5.0 mm.

As with the dimensions of the components, the number of cells is dependent upon the desired stiffness, crush characteristics, and materials employed. For example, the rail extension can have up to 4 cells. The rail extension can have 4 to 25 cells. The rail extension can have less than or equal to 50 cells.

The rail extensions disclosed herein are configured to absorb a significant amount of impact energy when subjected to axial loading while also having acceptable creep performance (i.e., less deformation upon impact). For example, the rail extension can have a creep performance when subjected to 4.5 MegaPascals (MPa) stress loading for 600 hours at 90° C. of negligible deformation (e.g., less than or equal to 5 mm, for example, less than or equal to 3 mm, and for example, less than or equal to 1 mm).

Figure 2:
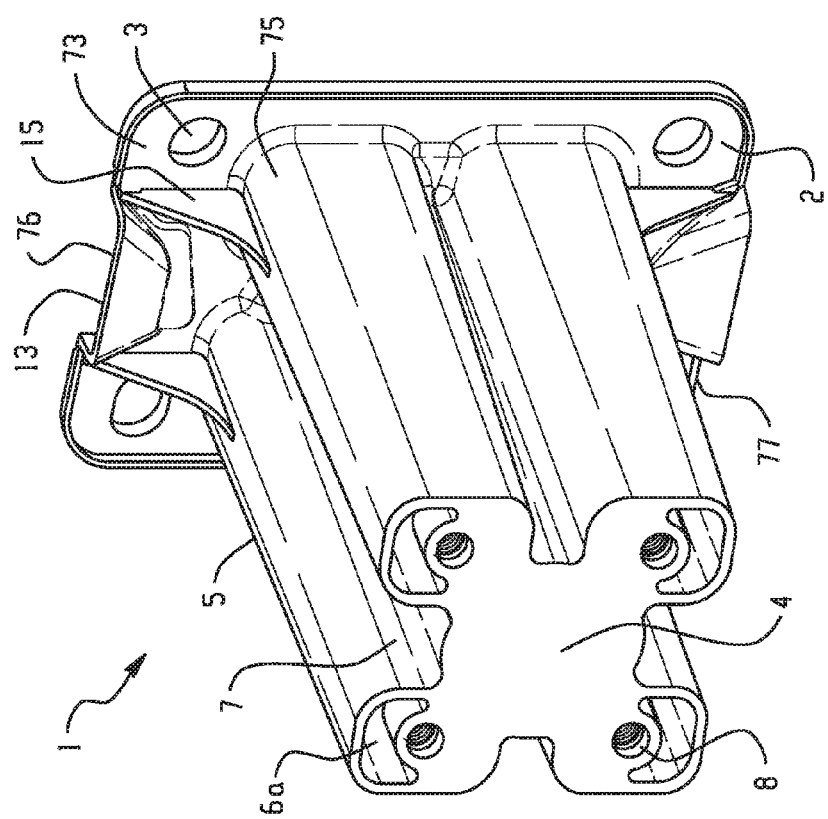
FIG. 2 is an isometric front view of a polymeric rail extension.

FIG. 1 illustrates a rail extension system 16. As shown in FIG. 1, a rail extension system can include vehicle rail 60 coupled to one end 72 of rail extension 1. Bumper beam 20 is coupled to an opposite end 74 of rail extension 1. Energy absorber 64 can be configured to attach to a portion of bumper beam 20. Fascia 66 can cover energy absorber 64 and bumper beam 20. FIG. 2 illustrates the rail extension 1 including base 2, body 5 extending from base 2 and toward front member 4. The rail extension 1 can include a polymeric material. As shown in FIG. 2, base 2 can include ribs 15 extending from a body facing surface 73 of base 2 to an outer surface 75 of body 5. The ribs 15 can include any cross-sectional shape that will provide the desired stiffness. For example, the ribs 15 can include a shape selected from triangular, rectangular, parabolic, or a combination comprising at least one of the foregoing. In addition, base 2 can include rail attachments 3 to facilitate attachment to a vehicle rail. Base 2 can include features such as notch 13 located at a top 76 and bottom 77 of base 2. The notch 13 can be symmetrical about a horizontal axis to facilitate the use of a single tool to produce both left and right rail extensions. Body 5 can include a plurality of cells 6, e.g., first cells 6a, that can extend from base 2, through body 5 to front member 4. Channels 7 can be located between adjacent cells 6. Front member 4 can include bumper beam attachments 8 to facilitate attachment of rail extension 1 to a bumper beam. Beam attachment 8 extends towards base 2 through front member 4. Beam attachment 8 can extend through a portion of the body 5. Beam attachment 8 can extend through the entirety of the body 5.

FIG. 3 illustrates a rear view of the rail extension 1 of FIG. 2. FIG. 3 is one possibility for the rear of rail extension 1 of FIG. 2. As can be seen in FIG. 3, rail attachments 3 extend through base 2. FIG. 3 further illustrates that the cells 6 can include a first cell 6a and a second cell 6b, where first cell 6a can extend from base 2, completely through body 5 to front member 4 (see FIG. 2) and second cell 6b can extend from base 2 and partially through body 5. Channels 7 located between adjacent first cells 6a are illustrated in FIG. 3. Notches 13 are illustrated as extending toward base 5. FIG. 4 illustrates the rail extension 1 of FIG. 2 including rail attachment insert 25. As shown in FIG. 4, base 2 can include ribs 15 extending from a body facing surface 73 of base 2 to an outer surface 75 of body 5. Ribs 15 can assist in guiding the crushing of the rail extension 1 smoothly. The ribs 15 can include any cross-sectional shape that will provide the desired stiffness. For example, the ribs 15 can include a shape selected from triangular, rectangular, parabolic, or a combination comprising at least one of the foregoing. In addition, base 2 can include rail attachments 3 to facilitate attachment to a vehicle rail. Base 2 can include features such as notch 13 located at a top 76 and bottom 77 of base 2. The notch 13 can be symmetrical about a horizontal axis to facilitate the use of a single tool to produce both left and right rail extensions. Body 5 can include a plurality of cells 6, e.g., first cells 6a, that can extend from base 2, through body 5 to front member 4. Front member 4 can include aperture 78. Channels 7 can be located between adjacent cells 6. Front member 4 can include bumper beam attachments 8 to facilitate attachment of rail extension 1 to a bumper beam. Beam attachment 8 extends towards base 2 through front member 4. Beam attachment 8 can extend through a portion of the body 5. Beam attachment 8 can extend through the entirety of the body 5. As shown in FIG. 4, each rail attachment 3 can include rail attachment insert 25. The size of rail attachment insert 25 can vary to accommodate varying mechanical fasteners. For example, rail attachment insert 25 can be sized to fit a bolt, screw, or similar fastener. Rail attachment insert 25 can reduce the stress on the rail extension due to the attachment to the vehicle. Optionally, rail attachment insert 25 can be a metallic material or a different polymeric material than the cells. For example, rail attachment insert 25 can include a metallic material, such as steel.

FIG. 5 is a front view of the rail extension 1 of FIGS. 2 and 4. As can be seen in FIG. 5, rail extension 1 includes base 2 with a notch 13 located at a top 76 and bottom 77 of base 2. The notch 13 can be symmetrical about a horizontal axis to facilitate the use of a single tool to produce both left and right rail extensions. Body 5 (see FIG. 2 or FIG. 4) can include a plurality of cells 6, e.g., first cells 6a, that can extend from base 2, through body 5 to front member 4. Cells 6 can terminate at front member 4. Base 2 can include ribs 15 and rail attachments 3. Channels 7 can be located between adjacent cells 6. Front member 4 can include bumper beam attachments 8 to facilitate attachment of rail extension 1 to a bumper beam. Beam attachment 8 extends towards base 2 through front member 4. Beam attachment 8 can extend through a portion of the body 5. Beam attachment 8 can extend through the entirety of the body 5 (see FIG. 4).

Figure 6:
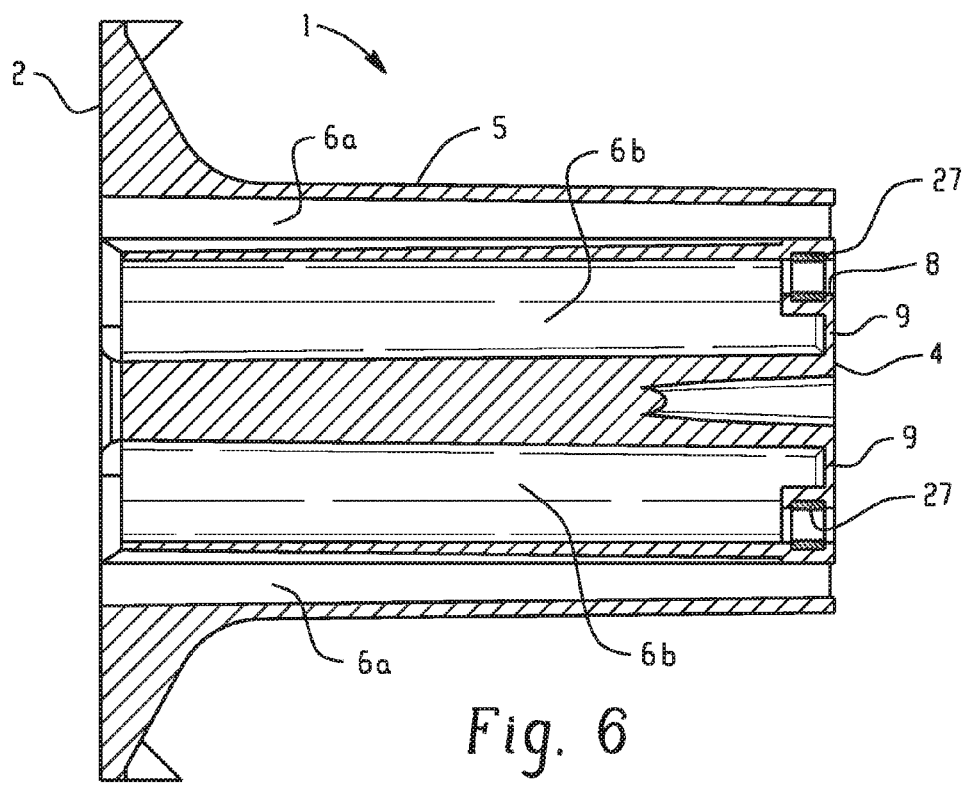
FIG. 6 is a cross-sectional side view of a polymeric rail extension with a beam attachment insert taken along the line A-A of FIG. 5.
Figure 7:
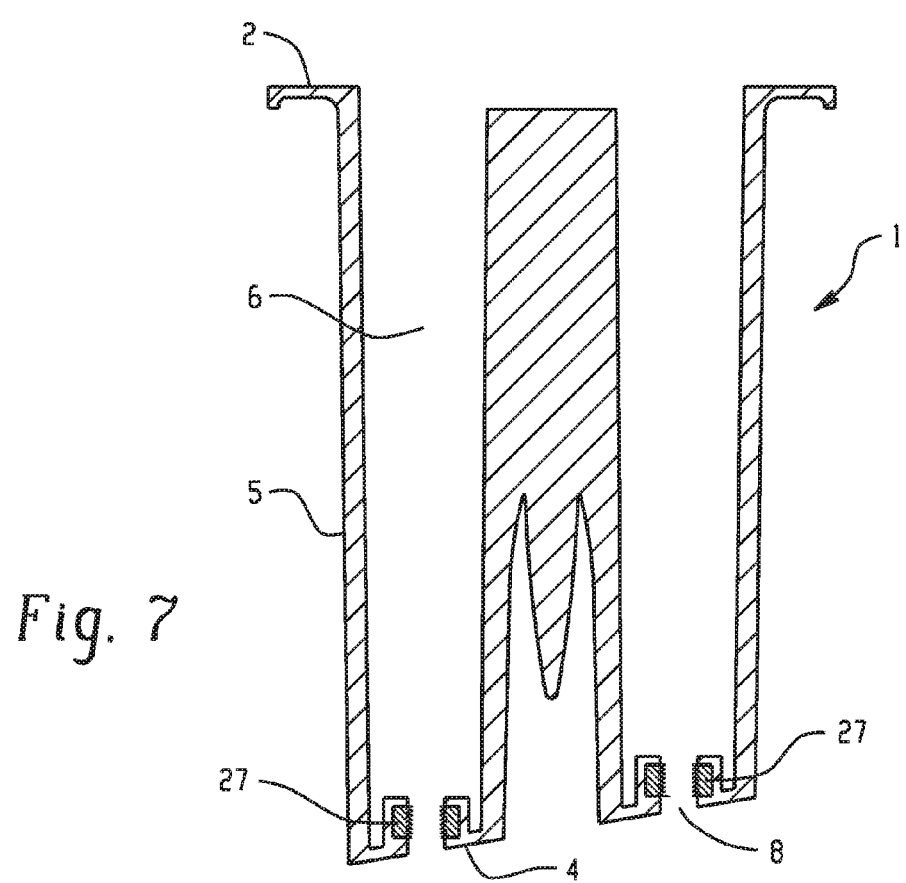
FIG. 7 is a cross-sectional top view of a polymeric rail extension with a beam attachment insert taken along the line B-B of FIG. 5.

FIG. 6 is a cross-sectional side view of the rail extension 1 of FIG. 5 taken along the line A-A. FIG. 7 is a cross-sectional top view of the rail extension 1 of FIG. 5 taken along the line B-B. As shown in FIGS. 6 and 7, beam attachments 8 can include beam attachment insert 27. Beam attachment insert 27 can include a metallic material, polymeric material, or a combination of metallic and polymeric materials. In addition, beam attachment insert 27 can include threading to accommodate a screw for attachment to a bumper beam. First cell 6a and second cell 6b are further illustrated in FIG. 6. As can be seen in FIG. 6, first cell 6a can extend from base 2, completely through body 5 to front member 4. Second cell 6b can extend from base 2, partially through body 5, terminating before reaching front member 4. Second cell 6b can include protrusion 9 extending toward the front member 4, but terminating before reaching the front member 4, so that protrusion 9 is not visible in a front view of rail extension 1. Protrusion 9 can be parallel to beam attachment insert 27 and can assist in providing structural integrity to the cells 6.

FIGS. 8A and 8B illustrate another rear view of rail extension 1 (e.g., a polymeric rail extension). As can be seen in FIG. 8A, rail attachments 3 extend through base 2. FIG. 8A further illustrates that the cells 6 can include a first cell 6a and a second cell 6b, where first cell 6a can extend from base 2, completely through body 5 (see FIG. 2) to front member 4 (see FIG. 2) and second cell 6b can extend from base 2 and partially through body 5. Beam attachments 8 can be isolated within first cell 6a. As shown in FIG. 8A, base 2 can include notches 13, which can be located on a top surface 76 and a bottom surface 77 of the base 2, where the notches can be symmetrical about a horizontal axis to facilitate the use of a single tool to produce both left hand and right hand rail extensions. FIG. 8A illustrates ribs 30 located in upper and second cells 6a, 6b. FIG. 8B is an expanded view of the circle area shown in FIG. 8A. As shown in FIG. 8B, rib 30 can be located in second cell 6b. Rib 30 can provide structural integrity to the cells 6a, 6b.

Figure 9:
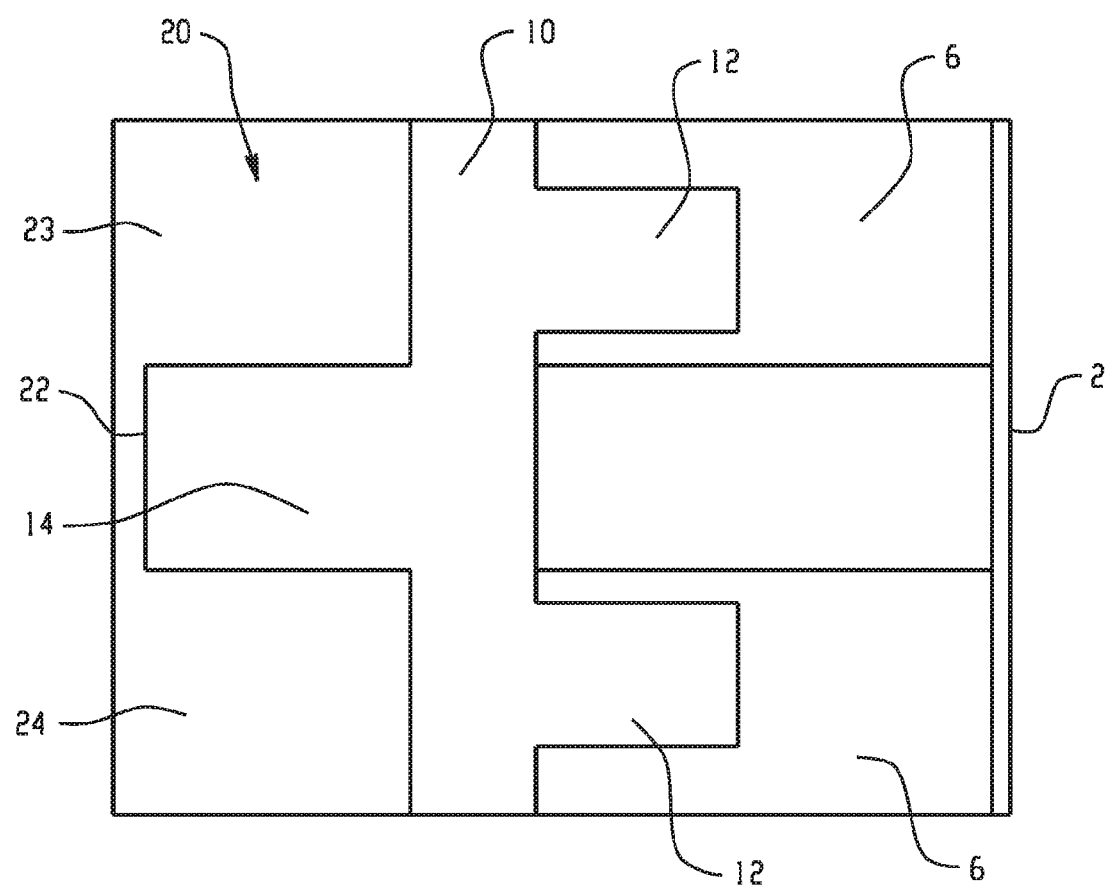
FIG. 9 is a cross-sectional side view of a bumper beam, beam connection plate, and polymeric rail extension.

FIG. 9 illustrates plate 10 including anti-climbing member 12 and anti-clashing member 14. Plate 10 can include a metallic material polymeric material, or a combination of metallic and polymeric materials. As shown in FIG. 9, anti-climbing member 12 projects toward base 2 and can be sized to fit within cell 6. Plate 10 can include more than one anti-climbing member 12. Anti-clashing member 14 projects away from base 2 and into a recess 22 in bumper beam 20. For example, when bumper beam 20 includes a "B-shaped" or "C-shaped" cross-section, anti-clashing member 14 can protrude into a recess 20 formed by upper and lower portions of beam 20. The beam 20 in FIG. 9 can be "B-shaped" and include upper portion 23 and lower portion 24 separated by recess 22. Anti-clashing member 14 can prevent clashing of upper section 23 and lower portion 24 during an impact to ensure proper crushing and energy absorption. Plate 10 can be joined to bumper beam 20 through welding, adhesive, mechanical fasteners, and the like, e.g., anti-climbing member can be inserted into cell 6 and plate 10 can be welded to beam 20.

Figure 10:
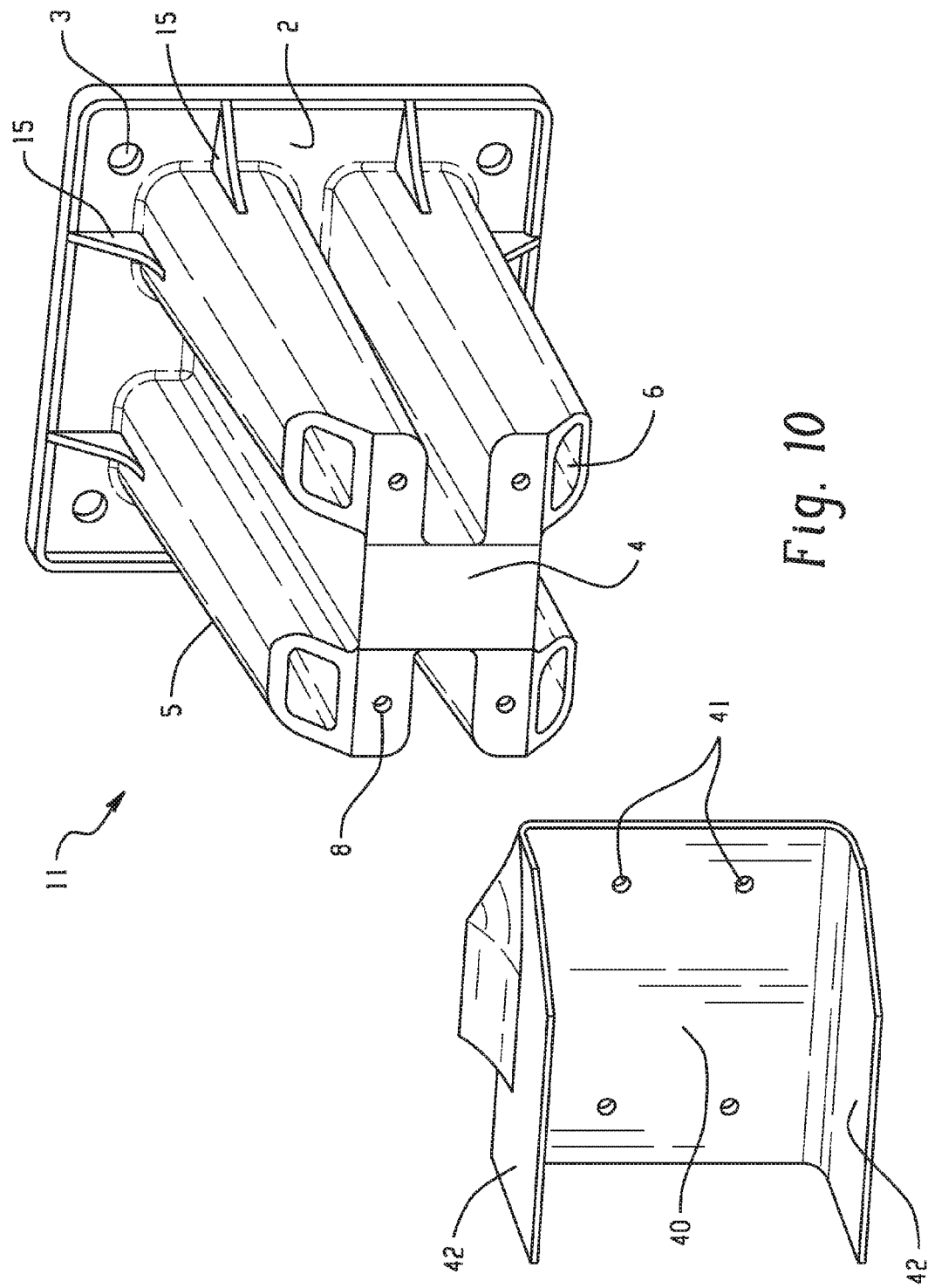
FIG. 10 is an isometric exploded front view of polymeric rail extension and a beam connection plate.

FIG. 10 illustrates rail extension 11. Body 5 extends from base 2 toward front member 4. Rail attachments 3 can be located in base 2 to assist in attaching the base 2 to a vehicle rail. Ribs 15 can extend from base 2 and be located on body 5 to assist in guiding crushing during an impact. Cells 6 located in base 5 can include a beveled edge. The beveling can be at an angle from front member 4 of greater than 0° to 60°. The beveling can be at an angle from front member 4 of 10° to 45°. The beveling can be at an angle from front member 4 of 15° to 35°. Rail extension 11 can include plate 40. As shown in FIG. 10, plate 40 can include plate attachment openings 41 configured to align with beam attachment openings 8. Thus, plate 40 can be attached to a bumper beam and front member 4 by a mechanical fastener such as a bolt, screw, and the like. Plate 40 can include one or more projections 42 that can overlap a top and/or bottom surface of a bumper beam. Thus, projections 42 can serve to prevent slippage between the bumper beam and the rail extension during impact.

Figure 11:
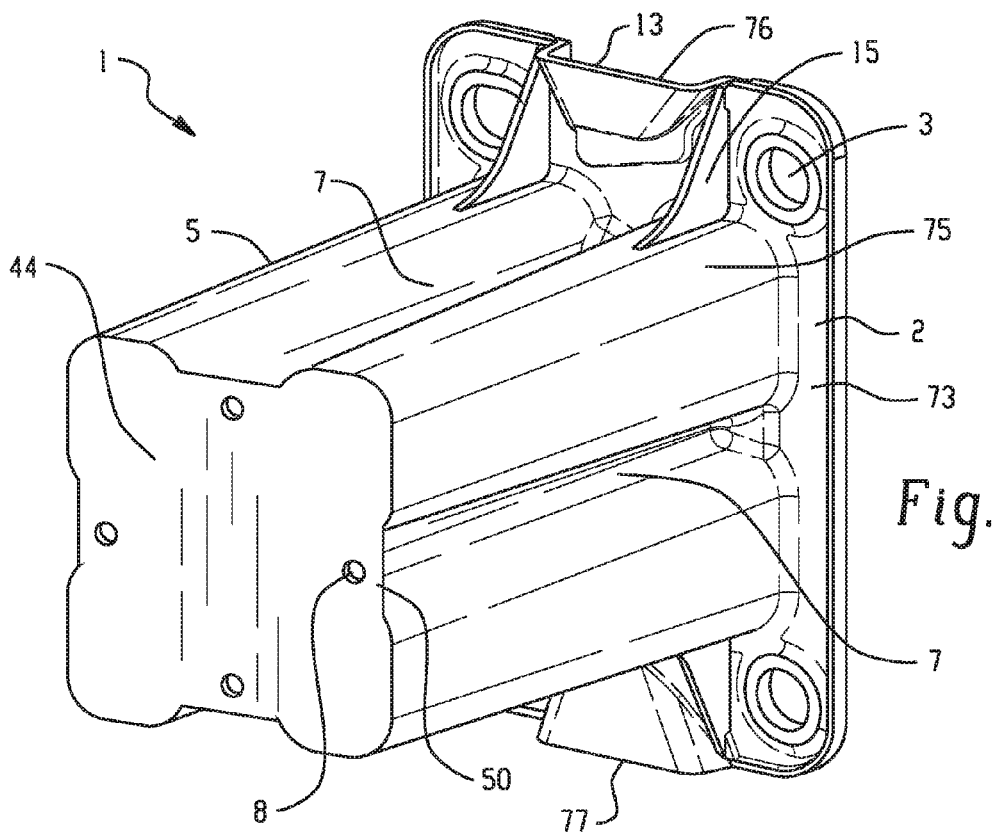
FIG. 11 is an isometric front view of polymeric rail extension and a beam connection plate.

FIG. 11 illustrates rail extension 1 with body 5 extending from base 2 toward front member 44. The rail extension 1 can include a polymeric material. As shown in FIG. 11, base 2 can include ribs 15 extending from a body facing surface 73 of base 2 to an outer surface 75 of body 5. The ribs 15 can include any cross-sectional shape that will provide the desired stiffness. For example, the ribs 15 can include a shape selected from triangular, rectangular, parabolic, or a combination comprising at least one of the foregoing. In addition, base 2 can include rail attachments 3 to facilitate attachment to a vehicle rail. Base 2 can include features such as notch 13 located at a top 76 and bottom 77 of base 2. The notch 13 can be symmetrical about a horizontal axis to facilitate the use of a single tool to produce both left and right rail extensions. Body 5 can include a plurality of cells 6 that can extend from base 2, through body 5 to front member 44. Front member 44 covers cells 6 in FIG. 11. Channels 7 can be located between adjacent cells 6. Front member 44 can include bumper beam attachments 8 to facilitate attachment of rail extension 1 to a bumper beam. Beam attachment 8 extends towards base 2 through front member 44. Beam attachment 8 can extend through a portion of the body 5. Beam attachment 8 can extend through the entirety of the body 5. FIG. 11 further illustrates another mechanism that can be used to attach the rail extension 1 to a beam. As shown in FIG. 11, tabs 50 extend from front member 44 between cells 6. In other words, tab 50 can extend into and cover a portion of channel 7. Each tab 50 includes a beam attachment 8 that can accommodate a fastener such as a bolt, screw, and the like. Tab 50 can include a reinforcing insert made from a metallic material, polymeric material, or a combination of metallic and polymeric material.

Figure 12:
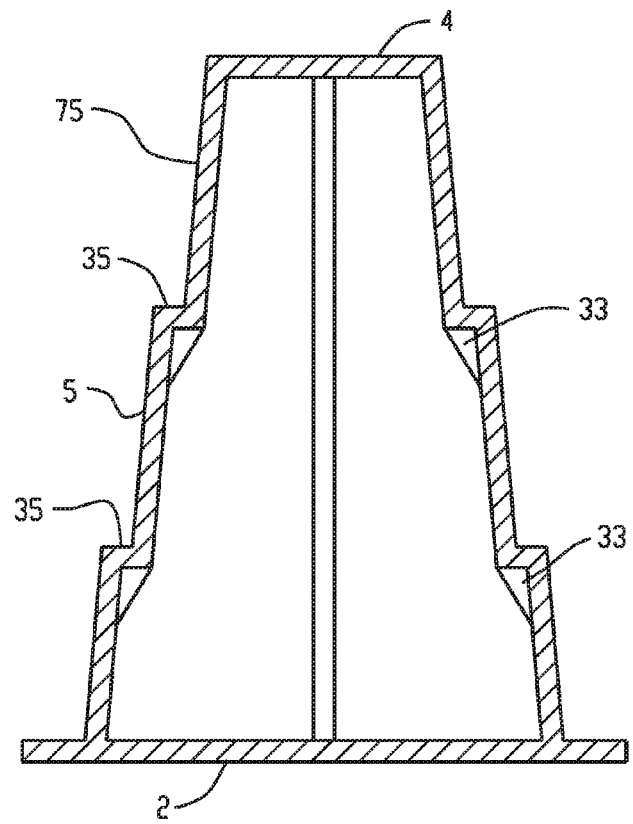
FIG. 12 is a cross-sectional top view of a polymeric rail extension having a progressive crush capability.
Figure 13:
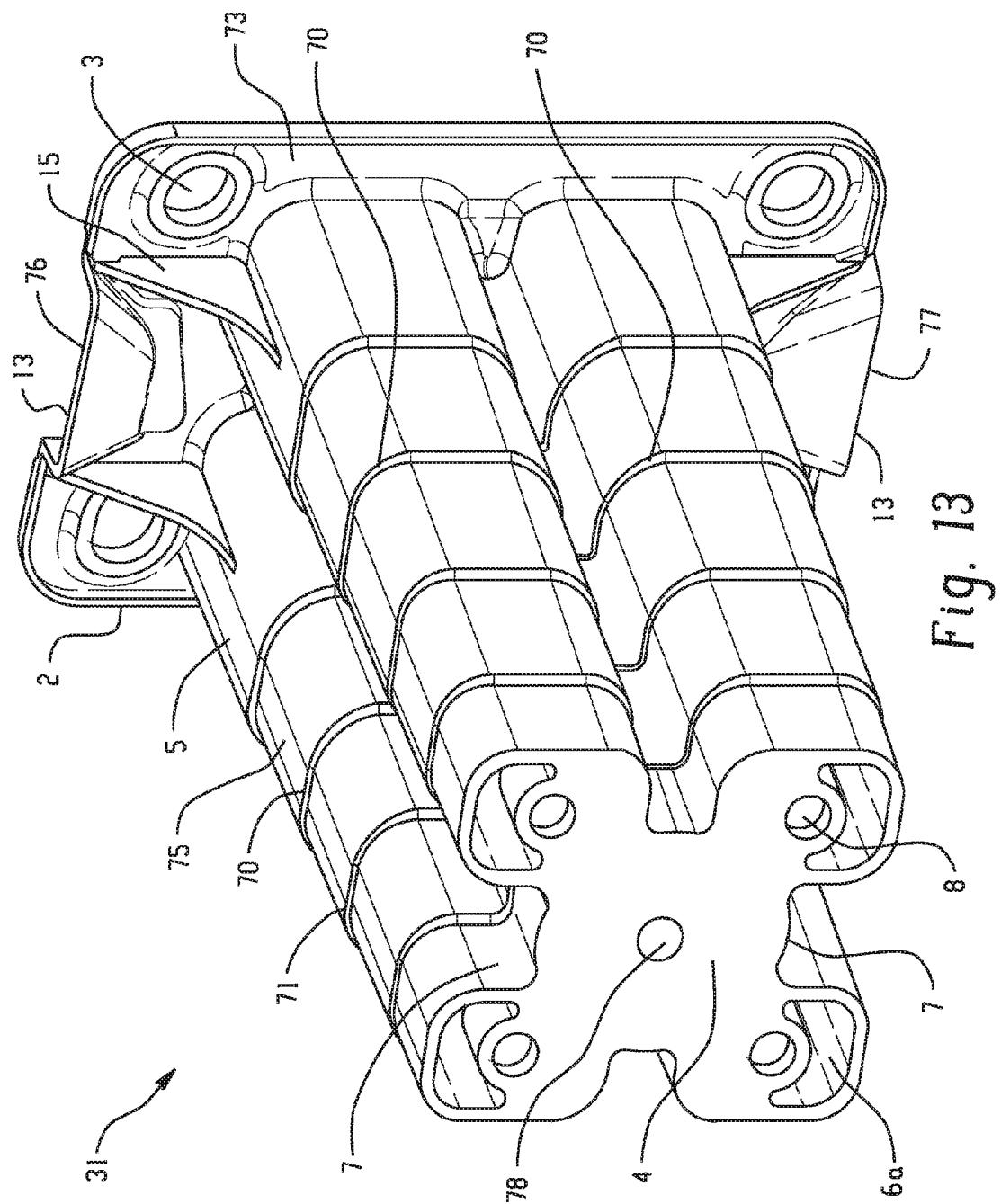
FIG. 13 is an isometric front view of a polymeric rail extension having crush initiators.

FIG. 12 illustrates a top cross-sectional view of a rail extension, for example, rail extension 1 or rail extension 11. As shown in FIG. 12, an outer surface 75 of body 5 can include one or more steps 35 that progressively become wider toward base 2. An internal rib 33 can join two adjacent steps 35 to provide additional stiffness to the rail extension. Thus, the rail extension can progressively dissipate a portion of the kinetic energy through plastic deformation and a programmed collapse starting from front member 4 to base 2. FIG. 13 illustrates an isometric side view of a rail extension 31 with crush initiators 70. FIG. 13 illustrates rail extension 31 with body 5 extending from base 2 toward front member 4. The rail extension 31 can include a polymeric material. As shown in FIG. 13, base 2 can include ribs 15 extending from a body facing surface 73 of base 2 to an outer surface 75 of body 5. The ribs 15 can include any cross-sectional shape that will provide the desired stiffness. For example, the ribs 15 can include a shape selected from triangular, rectangular, parabolic, or a combination comprising at least one of the foregoing. In addition, base 2 can include rail attachments 3 to facilitate attachment to a vehicle rail. Base 2 can include features such as notch 13 located at a top 76 and bottom 77 of base 2. The notch 13 can be symmetrical about a horizontal axis to facilitate the use of a single tool to produce both left and right rail extensions. Body 5 can include a plurality of cells 6, e.g., first cell 6a, that can extend from base 2, through body 5 to front member 4. Front member 4 covers cells 6 in FIG. 11. Channels 7 can be located between adjacent cells 6. Front member 4 can include bumper beam attachments 8 to facilitate attachment of rail extension 1 to a bumper beam. Beam attachment 8 extends towards base 2 through front member 4. Beam attachment 8 can extend through a portion of the body 5. Beam attachment 8 can extend through the entirety of the body 5. As shown in FIG. 13, crush initiator 70 can include a groove 71 formed in one or more sides of body 5. The groove can include a "V-shaped," "U-shaped," semi-sphere shape or other polygonal geometry. Crush initiator 70 can include an area of thinner material than the remainder of body 5. In the alternative, crush initiator 70 can include one or more holes in the walls of body 5. Crush initiators 70 can be spaced at regular intervals. One or more sides of body 5 can include crush initiators 70. Front member 4 can further include aperture 78.

Figure 14:
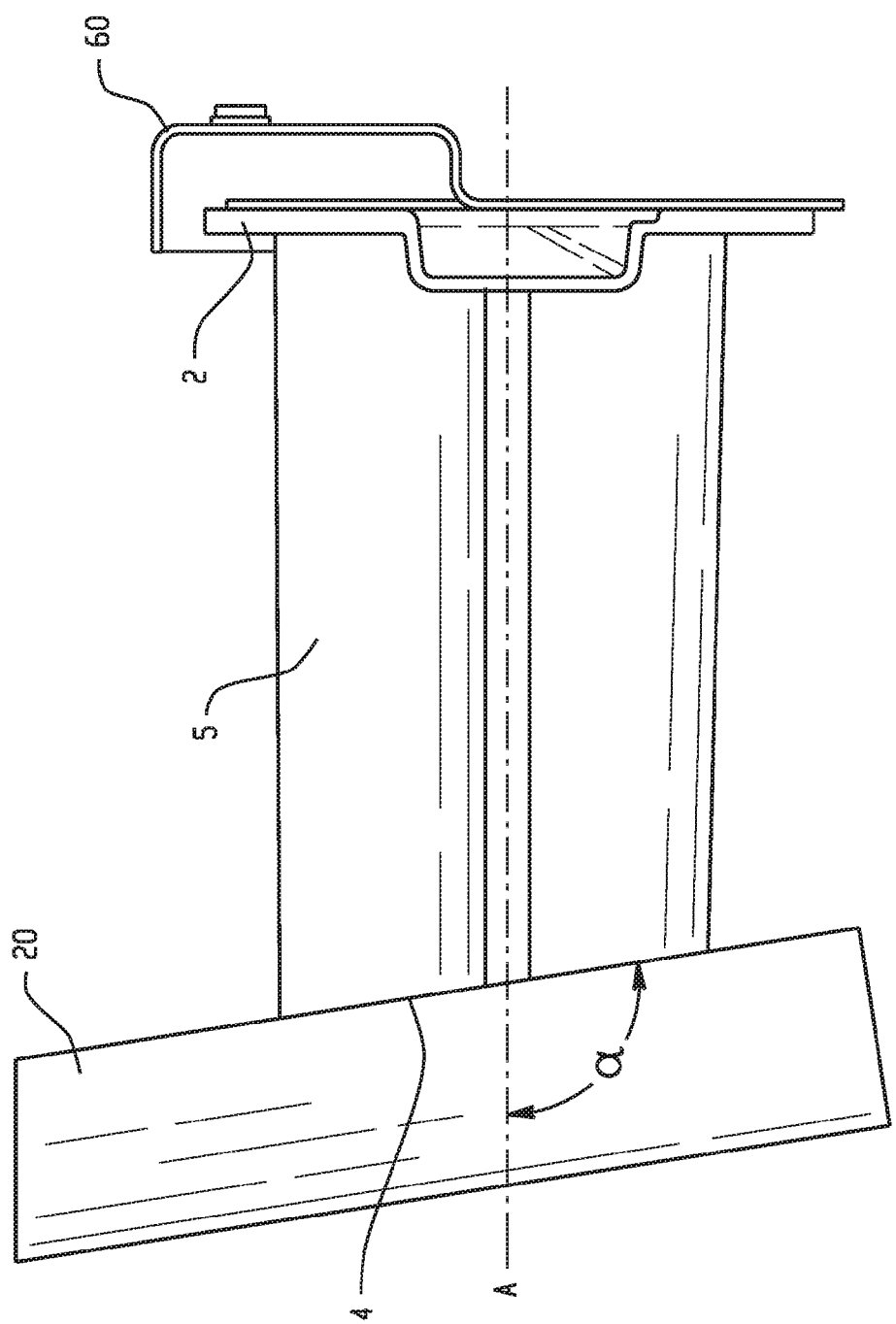
FIG. 14 is a top view of a polymeric rail extension having an angled front member.
Figure 15:
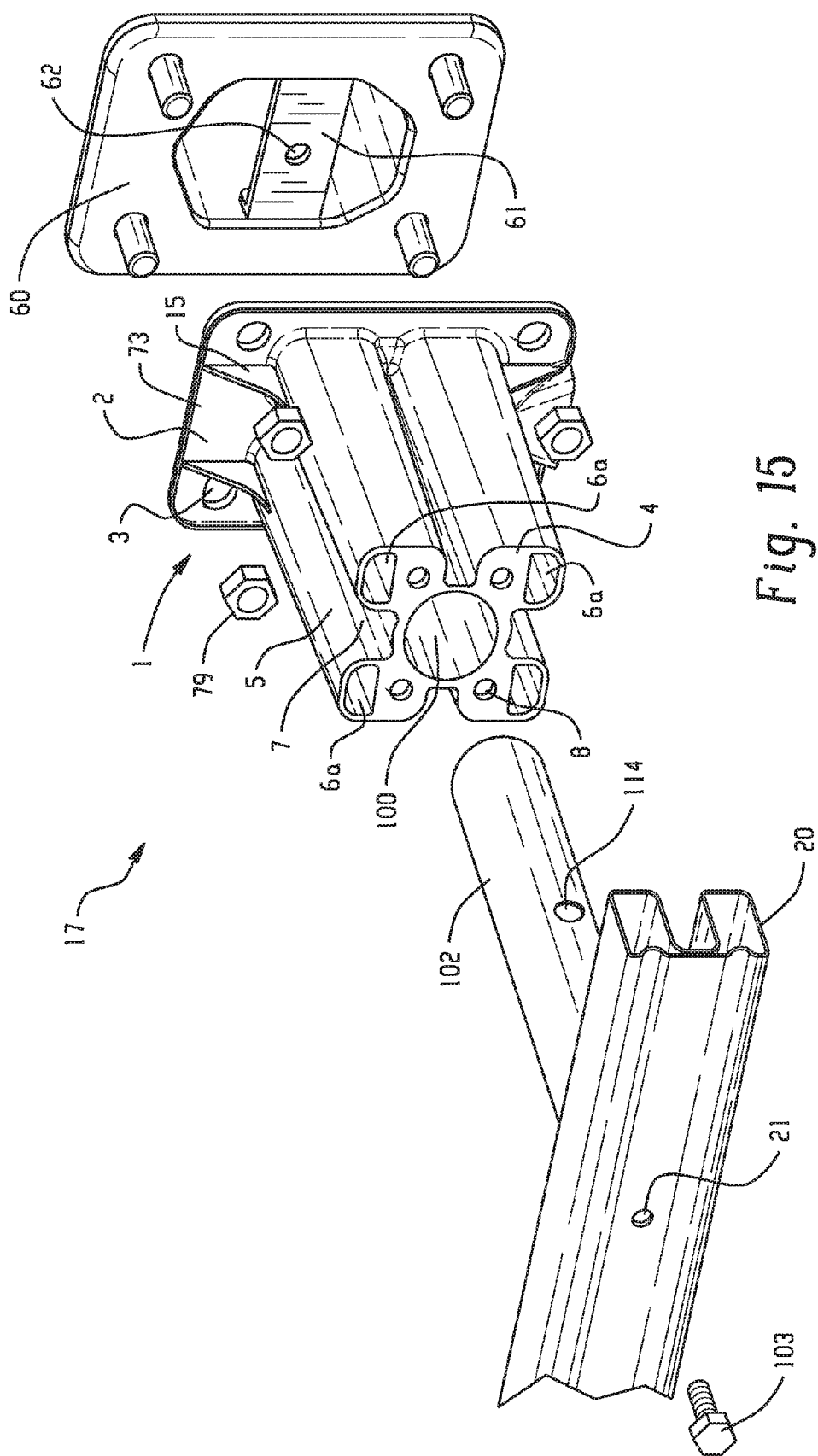
FIG. 15 is an exploded view of a vehicle rail extension system

FIG. 14 illustrates a top view of a rail extension as disclosed herein with a front member 4 having an angled surface with a base 2 attached to a rail 60. As shown in FIG. 14, front member 4 includes an angled surface to accommodate a curved bumper beam 20. Front member 4 can form an angle $\alpha$ of greater than 90° up to 170° with the longitudinal axis "A" of body 5. Front member 4 can include a flat surface (e.g., 90° to the longitudinal axis "A" of body 5) to accommodate a flat bumper beam 20. FIG. 15 illustrates a rail extension system 17. As shown in FIG. 15, a rail extension system 17 can include vehicle rail 60 coupled to one end of rail extension 1. The rail extension 1 can include base 2, body 5, and front member 4 with rail attachments 3 located on base 2 and bolts 79 to assist in attaching the rail extension 1 to the vehicle rail 60. Ribs 15 can extend from a body facing surface 73 of the base 2 configured to assist in crushing during an impact. Body 5 can include a plurality of cells 6a that can extend from base 2, through body 5 to front member 4. Front member 4 covers cells 6b in FIG. 15. Channels 7 can be located between adjacent cells 6a. Front member 4 can include bumper beam attachments 8 to facilitate attachment of rail extension 1 to a bumper beam. Beam attachment 8 extends towards base 2 through front member 4. Beam attachment 8 can extend through a portion of the body 5. Beam attachment 8 can extend through the entirety of the body 5. Aperture 100 can extend the length of the rail extension 1 from front member 4 to base 2 through body 5. Connection member 102, present on bumper beam 20, is configured to fit within aperture 100. Connection member 102 can include one or more crush initiators 114 to induce crushing of the connection member 102 during impact. Connection member 102 can be welded to bumper beam 20. Bumper beam 20 can include an access point 21 for inserting fastener 103 to join connection member 102 to vehicle rail 60. Vehicle rail 60 can include a rail attachment plate 61. Rail attachment plate 61 can be made from a metallic material and welded to vehicle rail 60. Rail attachment insert 62 can be located within rail attachment plate 61 and can include internal threading for receiving fastener 103.

Figure 16:
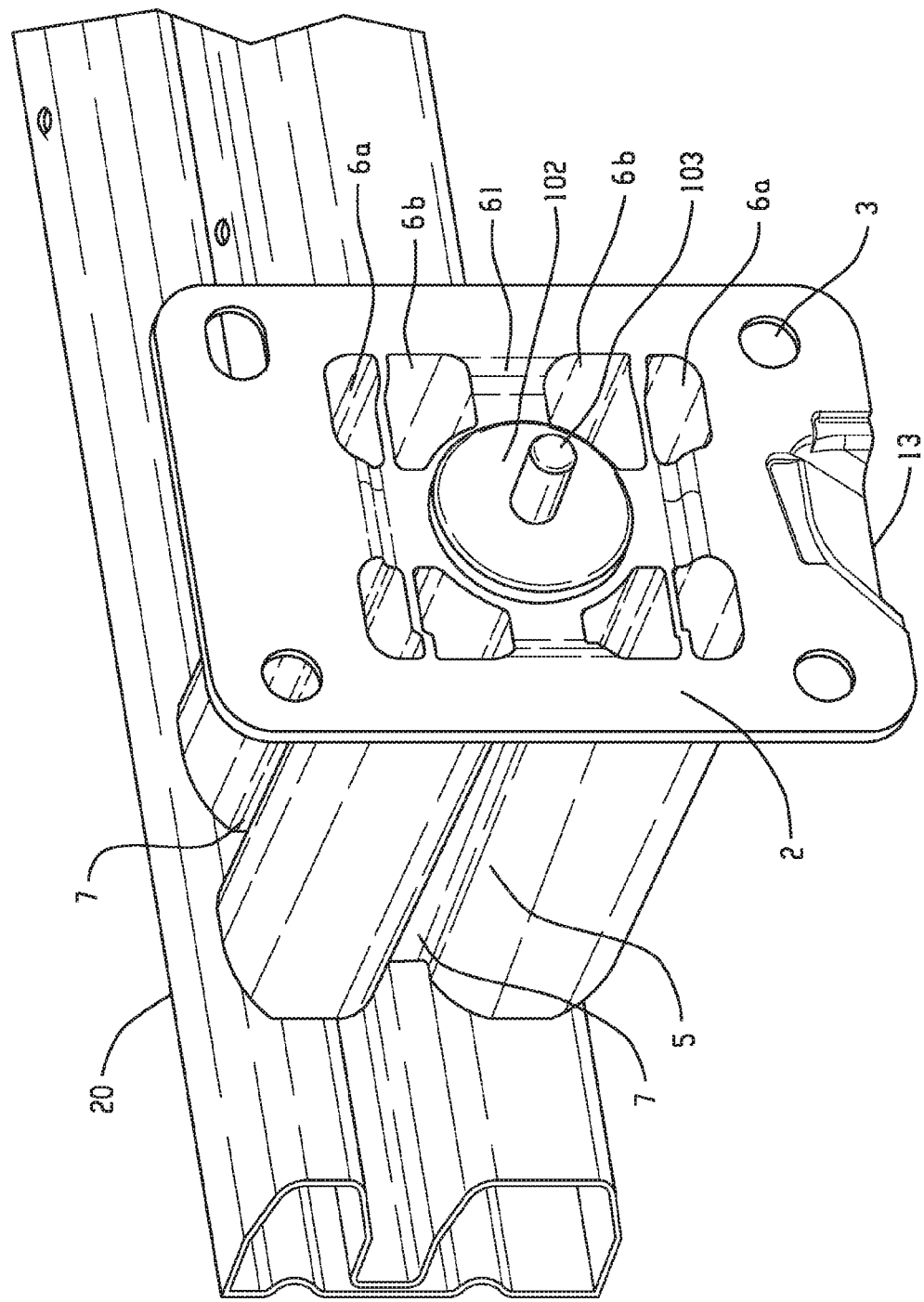
FIG. 16 is an isometric rear view of a polymeric rail extension system.

FIG. 16 illustrates a rear view of the rail extension system 17 of FIG. 15. As can be seen in FIG. 16, rail attachments 3 extend through base 2. FIG. 16 further illustrates that the cells 6 can include a first cell 6a and a second cell 6b, where first cell 6a can extend from base 2, completely through body 5 to front member 4 (see FIG. 15) and second cell 6b can extend from base 2 and partially through body 5. Channels 7 located between adjacent first cells 6a are illustrated in FIG. 16. Notches 13 are illustrated as extending toward base 5. As shown in FIG. 16, fastener 103 protrudes through an end of connection member 102. Fastener 103 then protrudes through rail attachment plate 61 to provide a metal to metal connection between the bumper beam 20, connection member 100, fastener 103, and vehicle rail 60.

Thus, the rail extension system 17 can withstand high temperatures and towing. In addition, the need to use a conductive material for the rail extension is eliminated.

Figure 17:
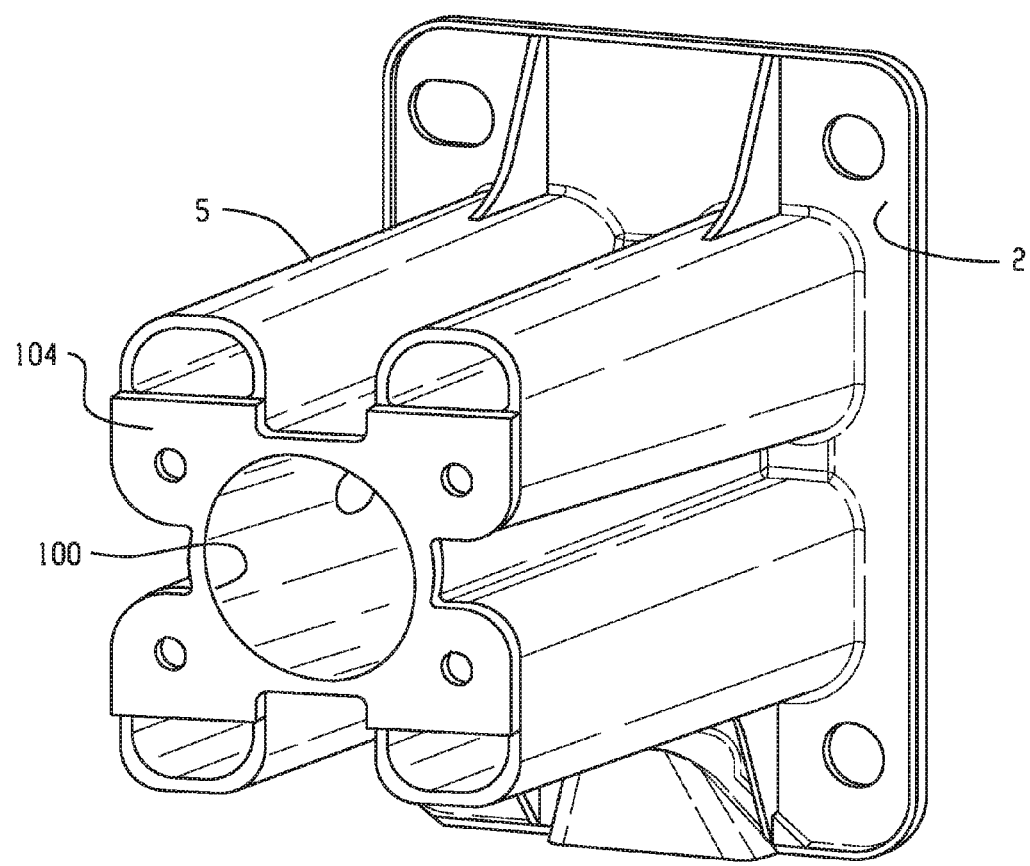
FIG. 17 is an isometric rear view of another polymeric rail extension system.
Figure 18:
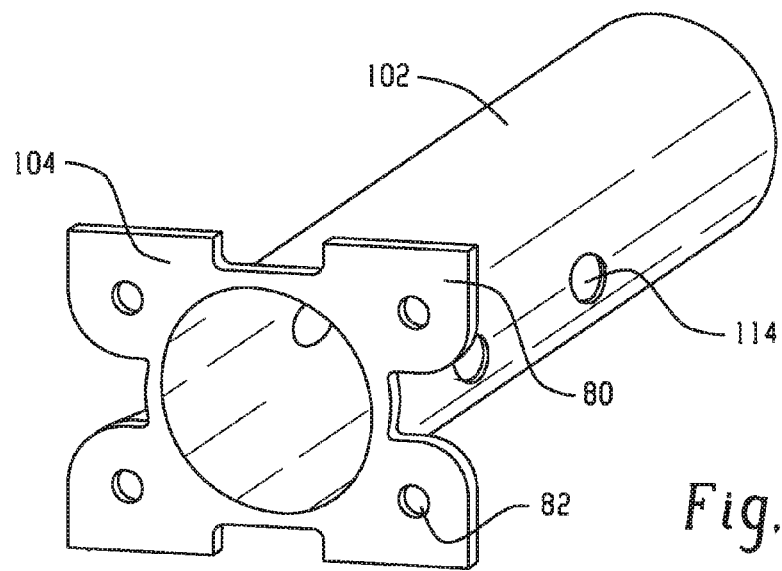
FIG. 18 is an isometric front view of a polymeric rail extension with a metallic connection member.
Figure 19:
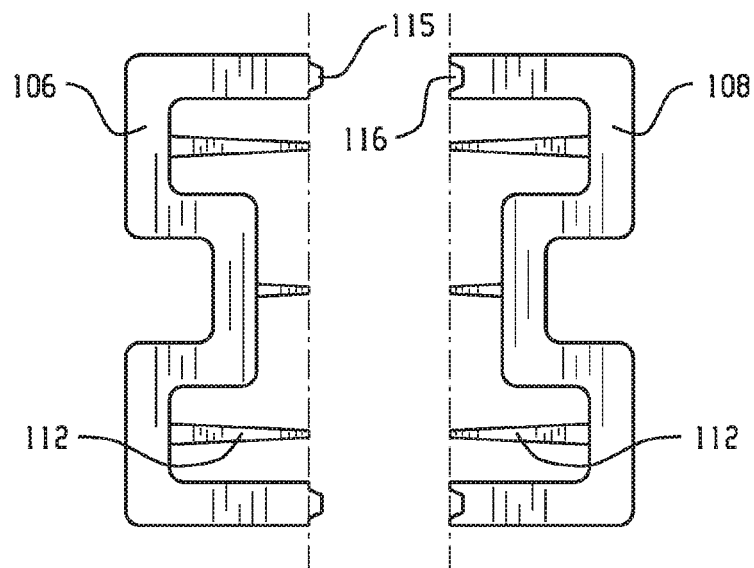
FIG. 19 is a front view of the metallic connection member of FIG. 18.

FIGS. 17 and 18 illustrate examples of joining connection member 100 to a rail extension where the rail extension includes a base 2 and body 5 extending from the base 2 and a bumper beam. As shown in FIGS. 17 and 18, beam attachments 104 extend radially from connection member 100 at front member 4, where beam attachments 104 cover front member 4. For example, beam attachments 104 can include tabs 80 with holes 82 configured to receive a fastener. Thus, beam attachments 104 can align with beam attachments 8 (see FIG. 2) on the rail extension to join a bumper beam, connection member 100, and rail extension. FIG. 19 illustrates a front view of a rail extension including two symmetrical portions 106, 108. As show in FIG. 19, the two portions 106 and 108 are symmetrical about a vertical axis of the rail extension. It is to be understood, however that portions 106 and 108 can be symmetrical about a horizontal axis. Accordingly, a single mold cavity can produce first portion 106 and second portion 108. First portion 106 and second portion 108 can be joined by vibration welding, adhesive, or other similar processes. To facilitate the joining of first portion 106 and second portion 108, attachment features such as protrusion 115 and recess 116 can be formed on an outer surface of each portion. The attachment features can include any complementary geometry. First portion 106 and second portion 108 can include one or more reinforcing members 112.

Figure 20:
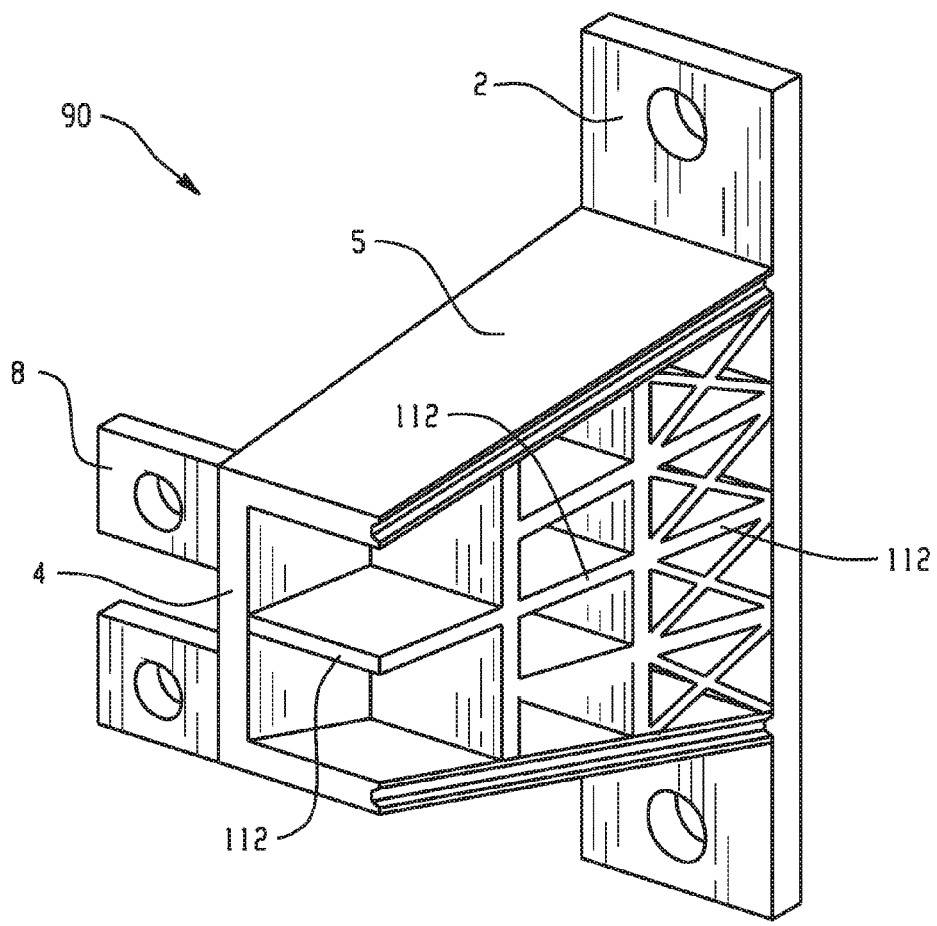
FIG. 20 is an isometric view of a symmetrical polymeric rail extension.

FIG. 20 illustrates a portion of multi-material rail extension 90. As shown in FIG. 20, body 5 can be made from a first polymeric material and reinforcement members 112 can be made from a second polymeric material. In addition, reinforcing members 112 can vary from front member 4 to base 2. Beam attachments 8 can extend outwardly from the front member 4. As shown in FIG. 20, the number of reinforcing members 112 increases from front member 4 to base 2. In addition, the type of reinforcing member can vary from front member 4 to base 2. As shown in FIG. 20, reinforcing members 112 adjacent base 2 can have an "X-shaped" structure. Reinforcing member 112 adjacent front member 4 can have simple horizontal rib structure. Thus, the rail extension can have a greater stiffness at base 2 than at front member 4.

Figure 22:
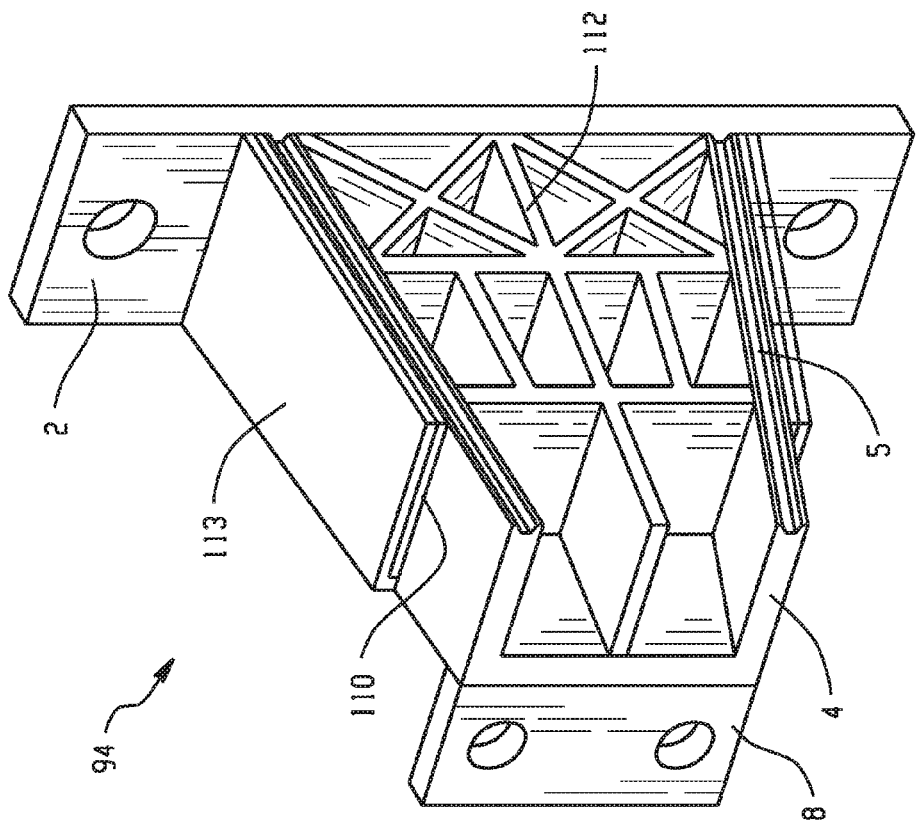
FIG. 22 is an isometric view of a portion of another polymeric rail extension with reinforcing members and an outer shell.
Figure 21:
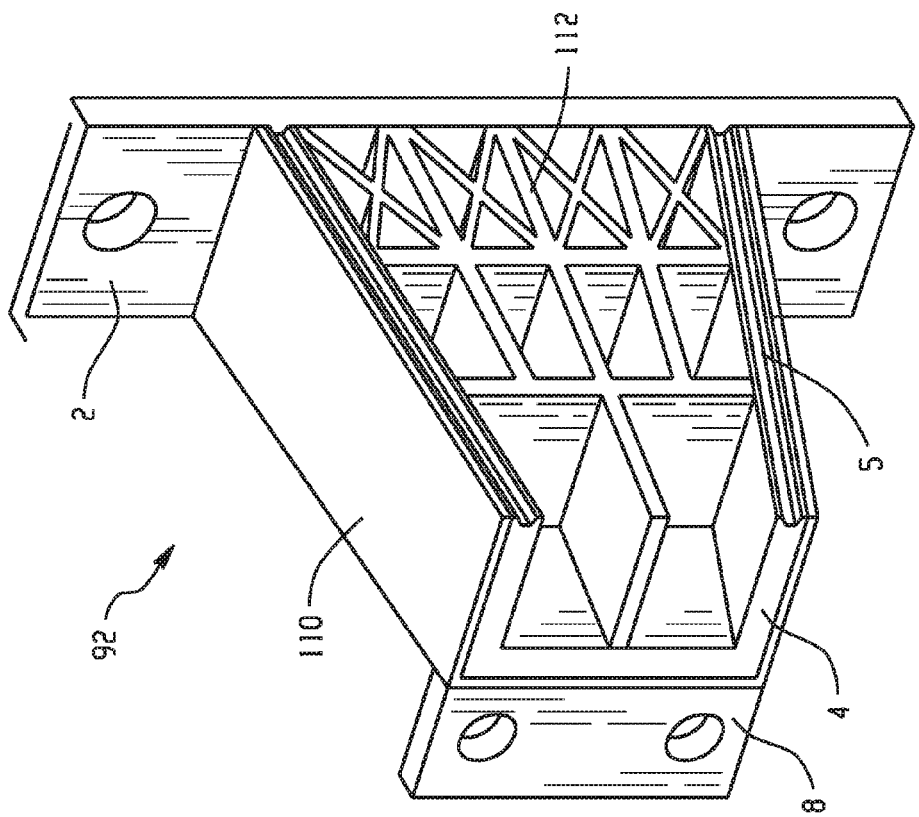
FIG. 21 is anisometric view of a portion of polymeric rail extension with reinforcing members.

FIG. 21 illustrates another portion of a multi-material rail extension 92. As shown in FIG. 21, outer shell 110 surrounds portions of the rail extension. Outer shell 110 can include a different material than the first polymeric material and the second polymeric material. For example, outer shell 110 can include a metallic material, carbon fiber reinforced polymeric material, glass fiber reinforced polymeric material, and combinations including at least one of the foregoing. Outer shell 110 can be overmolded onto portions of the rail extension. FIG. 22 illustrates another portion of a multi-material rail extension 94. As shown in FIG. 22, outer layer 113 can be added externally to the outer shell 110. Outer layer 113 can include the first polymeric material, the second polymeric material, or another polymeric material. Outer layer 113 can be overmolded onto outer shell 110.

As with FIG. 20, reinforcing members 112 in FIGS. 21 and 22 can vary from front member 4 to base 2. Beam attachment(s) 8 can extend outwardly from the front member 4. As shown in FIGS. 21 and 22, the number of reinforcing members 112 increases from front member 4 to base 2 along body 5. In addition, the type of reinforcing member can vary from front member 4 to base 2. As shown in FIGS. 21 and 22, reinforcing members 112 adjacent base 2 can have an "X-shaped" structure. Reinforcing member 112 adjacent front member 4 can have simple horizontal rib structure. Thus, the rail extension can have a greater stiffness at base 2 than at front member 4.

Figure 23:
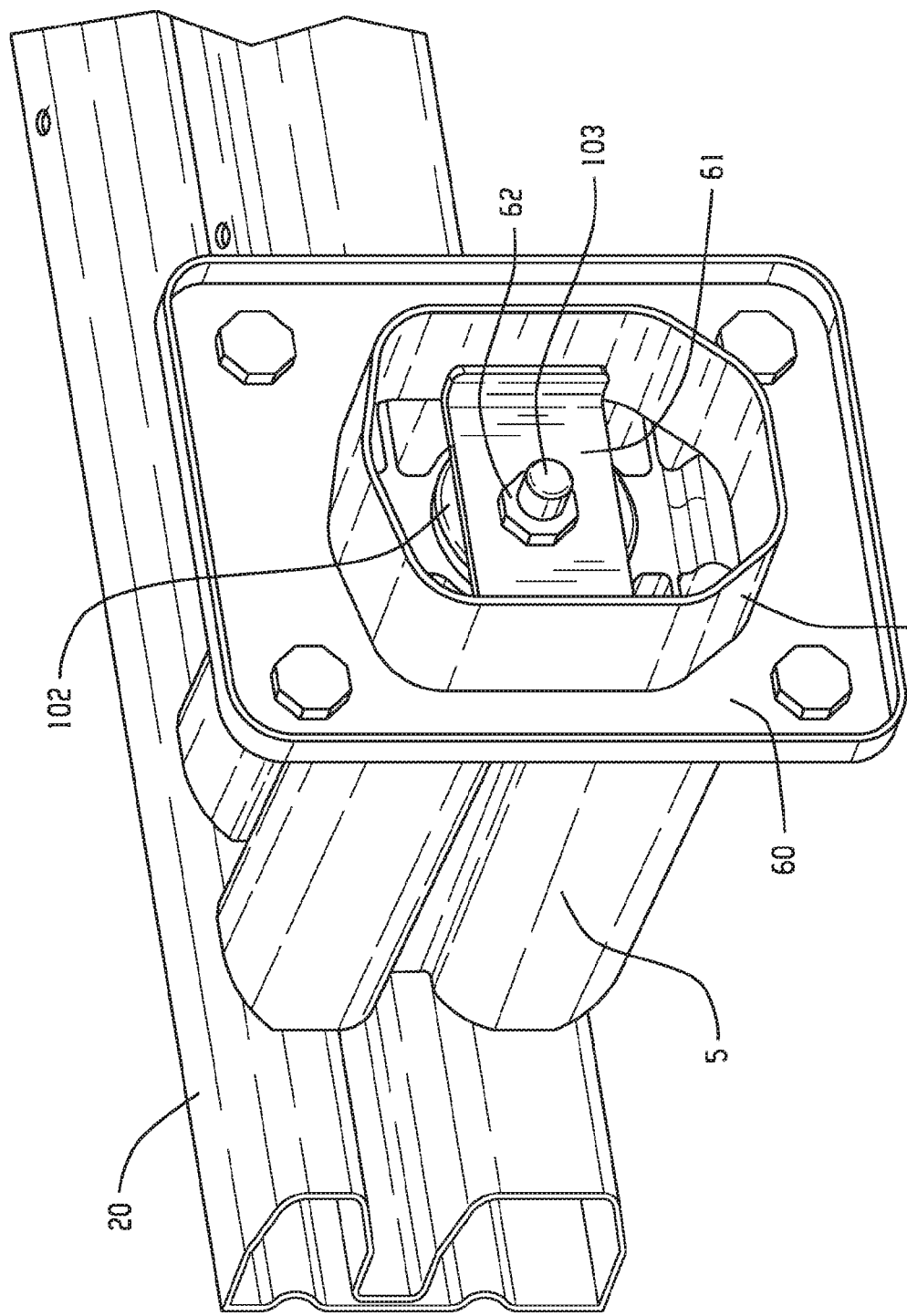
FIG. 23 is another isometric view of a portion of a polymeric rail extension with reinforcing member, an outer shell, and a cover layer.

FIG. 23 illustrates another rear view of the rail extension system 17 of FIG. 15. As can be seen in FIG. 23, fastener 103 protrudes through an end of connection member 102 and rail attachment insert 62. Reinforcing member 96 attaches to vehicle rail 60 with rail attachment plate 61 attached thereto. Fastener 103 then protrudes through rail attachment plate 61 to provide a metal to metal connection between the bumper beam 20, connection member 100, fastener 103, and vehicle rail 60. Thus, the rail extension system 17 can withstand high temperatures and towing. In addition, the need to use a conductive material for the rail extension is eliminated.

Any of the rail extensions or rail extension systems can be made by Additive Manufacturing (AM) which is a new production technology that makes three-dimensional (3D) solid objects of virtually any shape from a digital model. Generally, this is achieved by creating a digital blueprint of a desired solid object with computer-aided design (CAD) modeling software and then slicing that virtual blueprint into very small digital cross-sections. These cross-sections are formed or deposited in a sequential layering process in an AM machine to create the 3D object.

EXAMPLES

Figure 24:
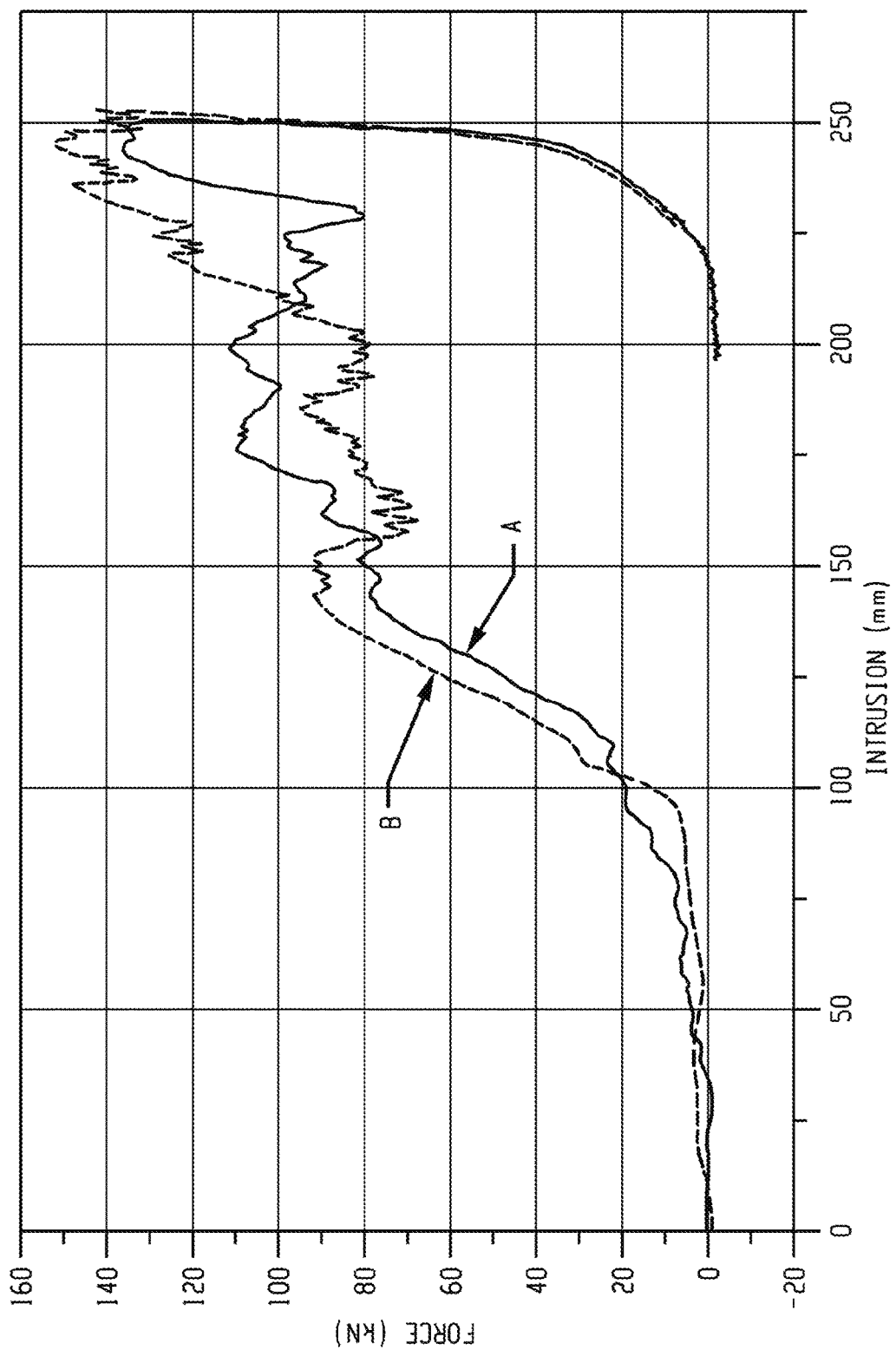
FIG. 24 is graphical representation of rail extension performance showing displacement (millimeters (mm)) versus force (kiloNewtons (kN)) for simulated metallic and polymeric rail extensions.
Figure 25:
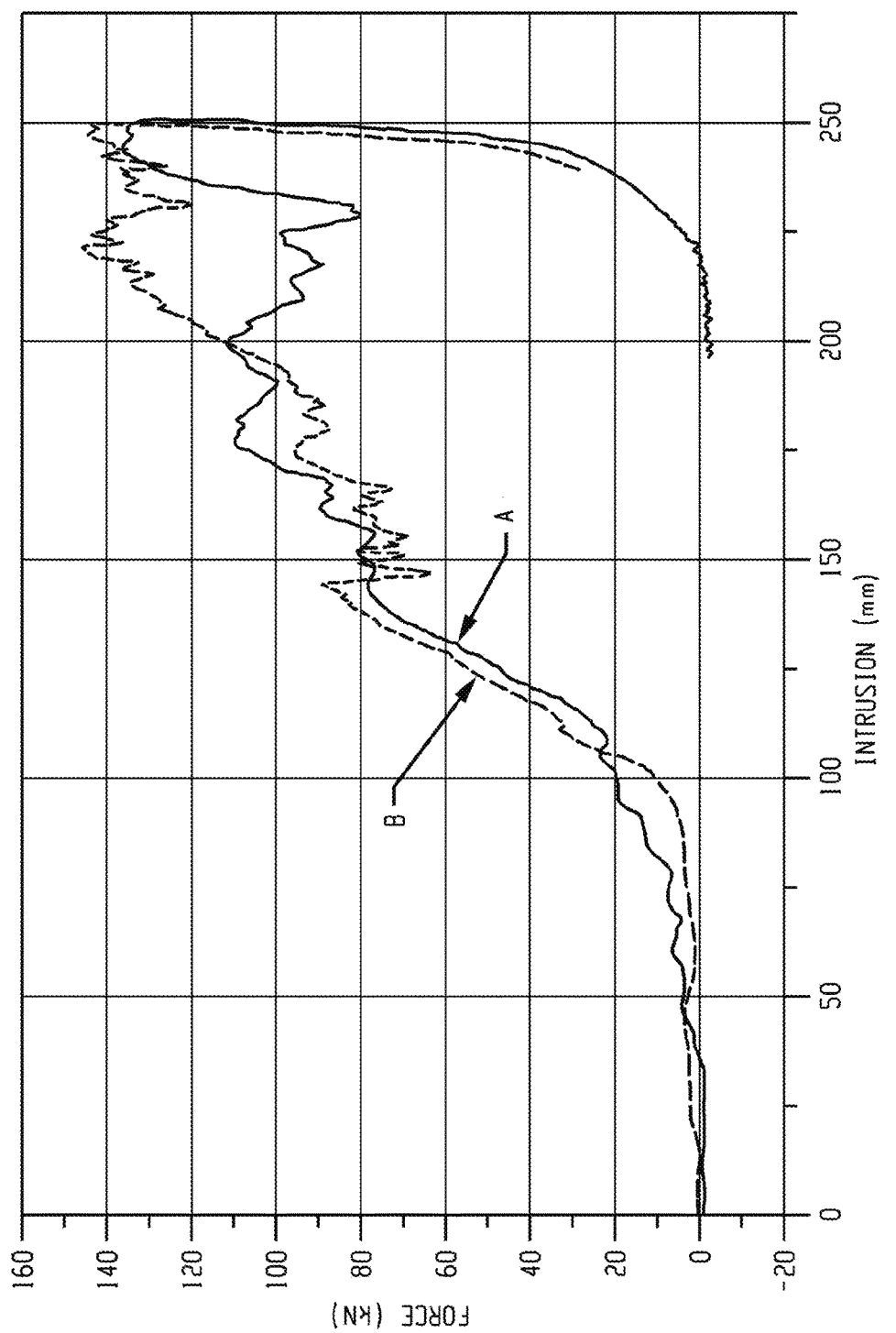
FIG. 25 is graphical representation of rail extension performance showing displacement (mm) versus force (kN) for simulated metallic and polymeric rail extensions.

FIGS. 24-27 are graphic illustrations of displacement versus force for a simulated impact. The design of the simulations is for a 15 kilometer per hour (kmph) 40% offset RCAR impact of a pendulum against an assembly of a rail extension system. The intrusion is measured as the displacement of the pendulum and the force as that experienced by the rail extension on the side of impact. FIG. 24 illustrates the use of a polymeric rail extension directly joined to the bumper beam as shown in FIG. 2. As shown in FIG. 24, the polymeric rail extension (B) produces an intrusion similar to steel rail (A) extension while reducing part count. A blend of polyamide (PA) and polyphenylene ether polymer (PPE) is used (e.g., NORYL™ GTX™ resin, commercially available from SABIC's Innovative Plastics business). FIG. 25 illustrates the use of a polymeric rail extension including a plate having both an anti-clasher and an anti-climber as illustrated in FIG. 9. As shown in FIG. 25, the polymeric rail extension (B) produced a reduction in intrusion compared to a steel rail extension (A). A blend of polyamide (PA) and polyphenylene ether polymer (PPE) is used (e.g., NORYL™ GTX™ resin, commercially available from SABIC's Innovative Plastics business).

Figure 26:
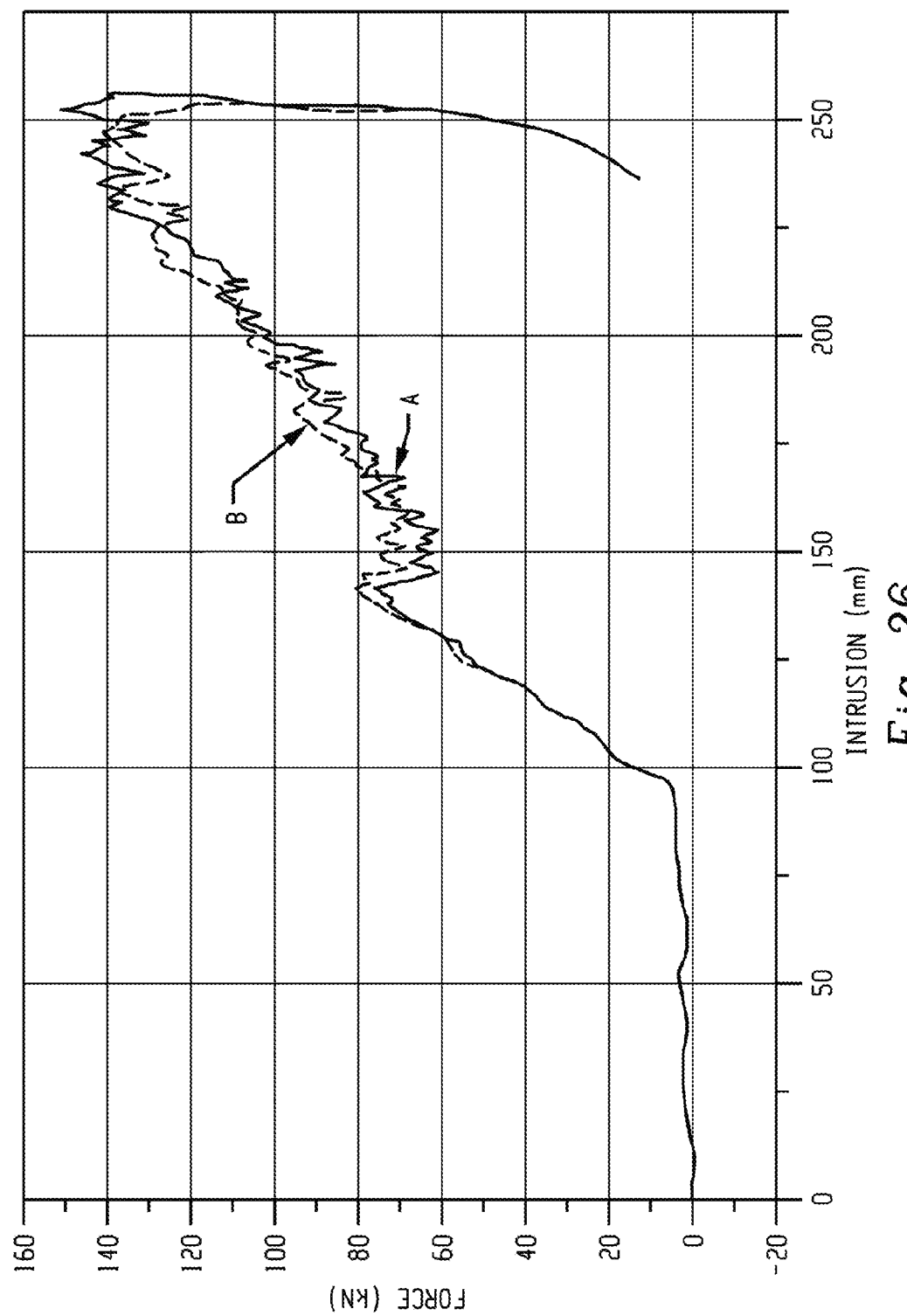
FIG. 26 is graphical representation of rail extension performance showing displacement (mm) versus force (kN) for simulated polymeric rail extensions with an anti-climber member and without an anti-climber member.
Figure 27:
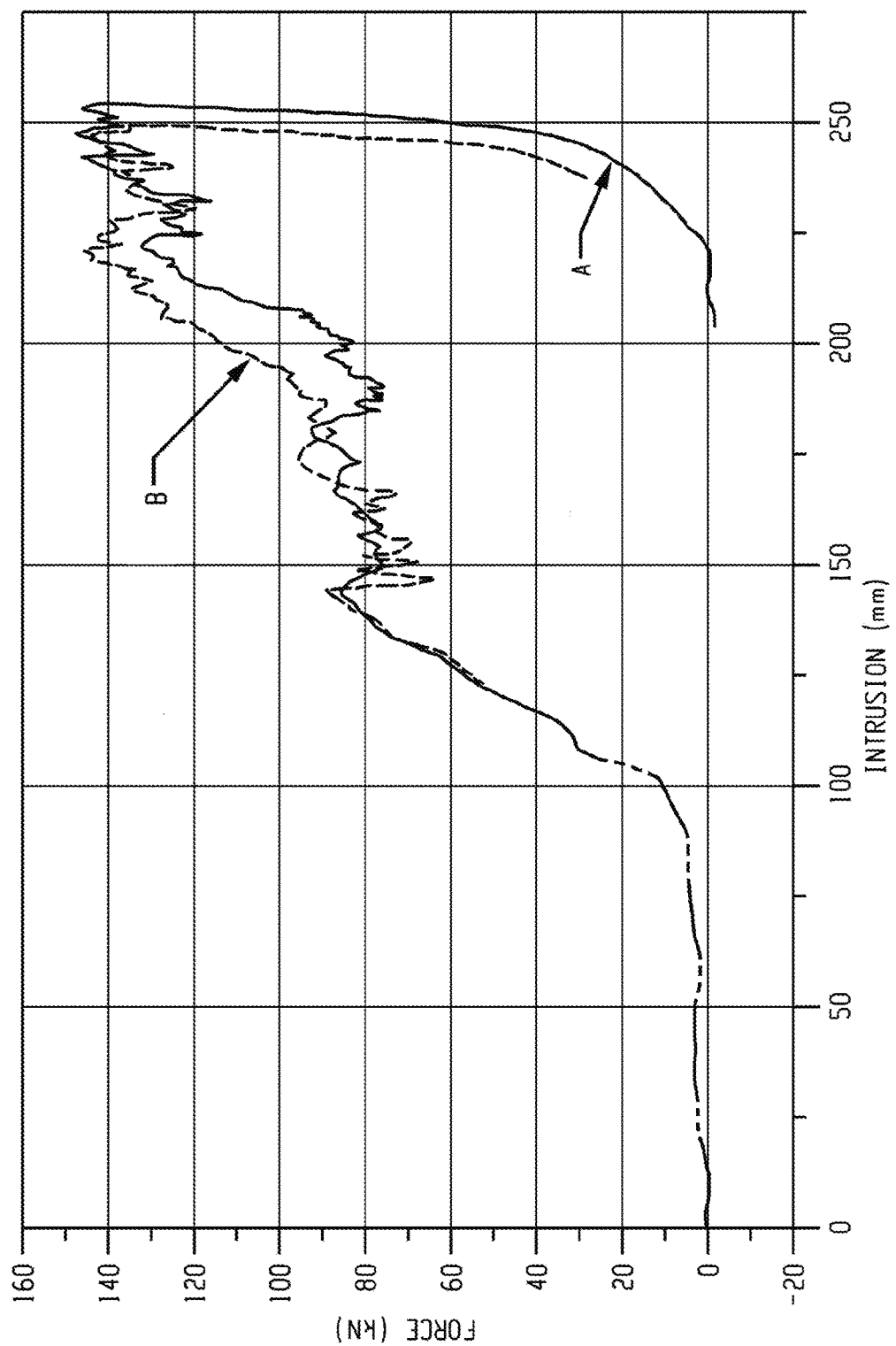
FIG. 27 is graphical representation of rail extension performance showing displacement (mm) versus force (kN) for simulated polymeric rail extensions with an anti-clasher member and without an anti-clasher member.

FIG. 26 illustrates the results of an impact on a polymeric rail extension without an anti-climber (A) and a polymeric rail extension with an anti-climber (B). As shown in FIG. 26, the polymeric rail extension with an anti-climber resulted in a reduction in intrusion of 2 mm. A blend of polyamide (PA) and polyphenylene ether polymer (PPE) is used (e.g., NORYL™ GTX™ resin, commercially available from SABIC's Innovative Plastics business). FIG. 27 illustrates the results of an impact on a polymeric rail extension without an anti-clasher (A) and a polymeric rail extension with an anti-clasher (B). As shown in FIG. 27, the polymeric rail extension with an anti-clasher resulted in a reduction in intrusion of 5 mm. A blend of polyamide (PA) and polyphenylene ether polymer (PPE) is used (e.g., NORYL™ GTX™ resin, commercially available from SABIC's Innovative Plastics business).

Set forth below are some embodiments of the rail extension, rail extension systems vehicles comprising the rail extensions, or rail extension systems and methods of making the same.

Embodiment 1: A rail extension, comprising: a base extending from one end of the rail extension, wherein the base includes vehicle rail attachments configured to attach to a vehicle rail; a front member configured for attachment to a bumper beam; a body extending from the base and toward the front member, wherein the base comprises cells formed by cell walls extending along at least a portion of a length of the body from the base toward the front member and forming cavities therethrough; open channels formed on each side of the body, wherein the open channels are defined by walls of adjacent cells; wherein the front member comprises a plurality of beam attachments that extend from the front member towards the base; and beam attachment inserts located within the beam attachments.

Embodiment 2: The rail extension of Embodiment 1, further comprising rail attachment inserts located within the rail attachments.

Embodiment 3: The rail extension of Embodiment 1 or Embodiment 2, further comprising a plate coupled to the front member, wherein the plate comprises an anti-climbing member extending toward the base and sized to fit within a cell and an anti-clashing member extending away from the base and configured to fit within a recess of the bumper beam.

Embodiment 4: The rail extension of any of Embodiments 1-3, wherein the cells extend an entire length of the body.

Embodiment 5: The rail extension of any of Embodiments 1-4, wherein the front member comprises an insert having internal threading for receiving a fastener.

Embodiment 6: The rail extension of any of Embodiments 1-5, wherein the rail extension is symmetrical about a horizontal line passing through a center of the rail extension.

Embodiment 7: The rail extension of any of Embodiments 1-6, wherein the base further comprises metal inserts located within the rail attachments.

Embodiment 8: The rail extension of any of Embodiments 1-7, wherein the base comprises at least one rib extending from a body facing surface of the base to an outside surface of the body.

Embodiment 9: The rail extension of any of Embodiments 1-8, wherein a cross-sectional area of a cell varies from the front member to the base.

Embodiment 10: The rail extension of any of Embodiments 1-9, wherein a thickness of at least a portion of the cell wall varies from the front member to the base.

Embodiment 11 The rail extension of any of Embodiments 1-3 and 5-10 wherein at least some of the cells do not extend the length of the body from the base to the front member.

Embodiment 12: The rail extension of any of Embodiments 1-11, wherein the cells have a cross-sectional geometry comprising circular, elliptical, polygonal shapes, and combinations including at least one of the foregoing.

Embodiment 13: The rail extension of any of Embodiments 1-12, wherein the body increases in cross-sectional area in a stepped geometry from the front member to the base.

Embodiment 14: The rail extension of any of Embodiments 1-13, wherein the rail extension comprises a polymeric material, metallic material, or combination comprising at least one of the foregoing.

Embodiment 15: The rail extension of any of Embodiments 1-14, wherein the rail extension comprises polybutylene terephthalate; acrylonitrile-butadiene-styrene; polycarbonate; polycarbonate/PBT blends; polycarbonate/ABS blends; copolycarbonate-polyesters; acrylic-styrene-acrylonitrile; acrylonitrile-(ethylene-polypropylene diamine modified)-styrene; phenylene ether resins; blends of polyphenylene ether/polyamide; polyamides; phenylene sulfide resins; polyvinyl chloride; high impact polystyrene; low/high density polyethylene; polypropylene; expanded polypropylene; thermoplastic olefins; and combinations including at least one of the foregoing.

Embodiment 16: The rail extension of any of Embodiments 1-15, wherein a cell includes an internal rib.

Embodiment 17: The rail extension of any of Embodiments 1-16, wherein the base, body, and front member form a unitary structure.

Embodiment 18: The rail extension of any of Embodiments 1-17, wherein cells adjacent to channels on two opposing sides of the body have a beveled surface.

Embodiment 19: The rail extension of Embodiment 18, wherein the beveled surface has a chamfer angle of greater than 0 to 60°.

Embodiment 20: The rail extension of Embodiment 18, wherein the chamfer angle is greater than 10° to 45°.

Embodiment 21: The rail extension of any of Embodiments 1-20, wherein the front member comprises an angled surface.

Embodiment 22: The rail extension of any of Embodiments 1-21, wherein the body comprises a crush initiator.

Embodiment 23: The rail extension of any of Embodiments 1-22, wherein the base comprises a rib extending from the base to an outer surface of the body.

Embodiment 24: The rail extension of any of Embodiments 1-23, further comprising an anti-climbing member coupled to the front member and extending into a cell.

Embodiment 25: The rail extension of any of Embodiments 1-24, further comprising a tab extending from the front member into a channel, wherein the tab comprises a beam attachment.

Embodiment 26: A method of making a rail extension of any of Embodiments 1-25, wherein the rail extension is formed through an extrusion or injection molding process.

Embodiment 27: A vehicle comprising: a bumper beam; a vehicle rail; and the rail extension of any of Embodiments 1-26 coupled to the bumper beam and the vehicle rail.

Embodiment 28: A rail extension system, comprising: a vehicle rail; a bumper beam; a polymeric rail extension attached to the vehicle rail on an end and attached to the bumper beam on another end, wherein the polymeric rail extension comprises: a base extending from one end of the rail extension, wherein the base includes vehicle rail attachments configured to attach to the vehicle rail; a front member configured for attachment to the bumper beam; a body extending from the base to the front member; an aperture extending through the base to the front member; and a connection member attached to the bumper beam and extending through the aperture configured to attach the rail extension to the vehicle rail.

Embodiment 29: The rail extension system of Embodiment 28, wherein the connection member further comprises bumper beam attachments extending from the connection member and configured for attachment to the bumper beam and the front member.

Embodiment 30: The rail extension system of Embodiment 28 or Embodiment 29, further comprising a rail attachment plate attached to the vehicle rail; wherein the rail attachment plate comprises a rail attachment insert; and a fastener configured to attach the connection member to the rail attachment insert.

Embodiment 31: The rail extension system of any of Embodiments 28-30, wherein the connection member is attached directly to the bumper beam through welding, riveting, bolting or adhesive.

Embodiment 32: The rail extension system of any of Embodiments 28-31, wherein the connection member comprises a metallic material or a composite material.

Embodiment 33: The rail extension system of any of Embodiments 28-32, wherein the rail attachment insert comprises an internal threading configured to receive the fastener.

Embodiment 34: The rail extension system of any of Embodiments 28-33, where in the connection member further comprises a crush initiator.

Embodiment 35: The rail extension system of any of Embodiments 28-34, wherein the rail extension is overmolded onto the connection member.

Embodiment 36: A method of forming a rail extension, comprises: molding a first portion; molding a second portion; and joining the first portion and the second portion; wherein the first portion and the second portion are symmetrical about an axis of the rail extension; wherein the first portion and the second portion comprise a base extending from one end of the rail extension having vehicle attachment configured to attach to a vehicle rail; a front member configured for attachment to a bumper beam; and a body extending from the base to the front member.

Embodiment 37: The method of Embodiment 36, wherein the first portion and the second portion comprise a first polymeric material overmolded onto a second polymeric material.

Embodiment 38: The method of Embodiment 36 or Embodiment 37, further comprising an outer shell located around at least a portion of the rail extension.

Embodiment 39: The method of any of Embodiments 36-38, wherein the first portion and the second portion comprise reinforcing members.

Embodiment 40: The method of Embodiment 37, wherein the reinforcing members comprise a different polymeric material or the same polymeric material as the first portion and the second portion.

Embodiment 41: The method of any of Embodiments 37-40, wherein the first polymeric material comprises polycarbonate, polyamide, polyphenylene ether, polybutylene terephthalate, polyethylene terephthalate, and combinations including at least one of the foregoing.

Embodiment 42: The method of any of Embodiments 37-41, wherein the second polymeric material comprises a reinforced polymeric material.

Embodiment 43: The method of Embodiment 38, wherein the outer shell comprises a metallic material, carbon fiber reinforced polymeric material, glass fiber reinforced polymeric material, and combinations including at least one of the foregoing.

Embodiment 44: The method of any of Embodiments 36-43, wherein the first portion and the second portion are symmetrical along a vertical axis of the rail extension.

Embodiment 45: The method of any of Embodiments 36-44, wherein the first portion and the second portion are symmetrical along a horizontal axis of the rail extension.

Embodiment 46: The method of any of Embodiments 36-45, wherein joining the first portion and the second portion comprises at least one of vibration welding, adhesive, and combinations including at least one of the foregoing.

Embodiment 47: The method of any of Embodiments 36-47, wherein the first portion and the second portion are formed in the same mold cavity.

Embodiment 48: A rail extension, comprises: a base extending from an end of the rail extension, wherein the base includes vehicle rail attachments configured to attach to a vehicle rail; a front member configured for attachment to a bumper beam; a body extending from the base to the front member; wherein the body comprises reinforcing members; wherein the body comprises a first polymeric material; wherein the reinforcing members comprise a second polymeric material.

Embodiment 49: The rail extension of Embodiment 48, further comprising an outer shell located around at least an outer portion of the rail extension.

Embodiment 50: The rail extension of Embodiment 48 or Embodiment 49, wherein the first polymeric material comprises polycarbonate, polyamide, polyphenylene ether, polybutylene terephthalate, polyethylene terephthalate, and combinations including at least one of the foregoing.

Embodiment 51: The rail extension of any of Embodiments 48-50, wherein the second polymeric material comprises reinforced polymeric material.

Embodiment 52: The rail extension of any of Embodiments 48-51, wherein the outer shell comprises a metallic material, carbon fiber reinforced polymeric material, glass fiber reinforced polymeric material and combinations including at least one of the foregoing.

Embodiment 53: The rail extension of any of Embodiments 48-52, wherein the first portion and the second portion are symmetrical along a vertical axis of the rail extension.

Embodiment 54: The rail extension of any of Embodiments 48-53, wherein the first portion and the second portion are symmetrical along a horizontal axis of the rail extension.

Embodiment 55: The rail extension of any of Embodiments 48-54, wherein joining the first portion and the second portion comprises at least one of vibration welding, adhesive, and combinations including at least one of the foregoing.

Embodiment 56: A method of making a rail extension of any of Embodiments 48-55, comprising forming the front member, body, base, and reinforcing members through an additive manufacturing process.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A rail extension, comprising:
a base extending from one end of the rail extension, wherein the base includes vehicle rail attachments configured to attach to a vehicle rail;
a front member configured for attachment to a bumper beam;
a body extending from the base and toward the front member, wherein the base comprises cells formed by cell walls extending along at least a portion of a length of the body from the base toward the front member and forming cavities therethrough;
open channels formed on each side of the body, wherein the open channels are defined by walls of adjacent cells;
wherein the front member comprises a plurality of beam attachments that extend from the front member to the base;
beam attachment inserts located within the beam attachments; and
wherein the rail extension further comprises:
a plate coupled to the front member, wherein the plate comprises an anti-climbing member extending toward the base and sized to fit within a cell and an anti-clashing member extending away from the base and configured to fit within a recess of the bumper beam; or
an anti-climbing member coupled to the front member and extending into a cell and a tab extending from the front member into a channel, wherein the tab comprises a beam attachment.

2. The rail extension of claim 1, further comprising rail attachment inserts located within the rail attachments.

3. The rail extension of claim 1, wherein the cells extend an entire length of the body, or wherein at least some of the cells do not extend the length of the body from the base to the front member.

4. The rail extension of claim 1, wherein the rail extension comprises polybutylene terephthalate; acrylonitrile-butadiene-styrene; polycarbonate;
polycarbonate/PBT blends; polycarbonate/ABS blends; copolycarbonate-polyesters; acrylic-styrene-acrylonitrile; acrylonitrile-(ethylene-polypropylene diamine modified)-styrene; phenylene ether resins; blends of polyphenylene ether/polyamide; polyamides; phenylene sulfide resins; polyvinyl chloride; high impact polystyrene; low/high density polyethylene; polypropylene; expanded polypropylene; thermoplastic olefins; and combinations including at least one of the foregoing.

5. The rail extension of claim 1, wherein cells adjacent to channels on two opposing sides of the body have a beveled surface and wherein the beveled surface has a chamfer angle of greater than 0 to 60°.

6. A vehicle, comprising:
a bumper beam;
a vehicle rail; and
the rail extension of claim 1 coupled to the bumper beam and the vehicle rail.

7. The vehicle of claim 6,
wherein the rail extension is a polymeric rail extension; wherein the polymeric rail extension further comprises an aperture extending through the base to the front member; and
a connection member attached to the bumper beam and extending through the aperture configured to attach the rail extension to the vehicle rail.

8. The rail extension system of claim 7, wherein the connection member further comprises bumper beam attachments extending from the connection member and configured for attachment to the bumper beam and the front member and wherein the rail extending system further comprises a rail attachment plate attached to the vehicle rail; wherein the rail attachment plate comprises a rail attachment insert; and a fastener configured to attach the connection member to the rail attachment insert.

9. A method of forming the extension of claim 1, comprising:
molding a first portion;
molding a second portion; and
joining the first portion and the second portion;
wherein the first portion and the second portion are symmetrical about an axis of the rail extension;
wherein the first portion and the second portion comprise the base extending from one end of the rail extension having vehicle attachment configured to attach to the vehicle rail; the front member configured for attachment to the bumper beam; and the body extending from the base to the front member.

10. The method of claim 9, wherein the first portion and the second portion comprise a first polymeric material overmolded onto a second polymeric material.

11. The method of claim 9, wherein the first portion and the second portion comprise reinforcing members.

12. The method of claim 11, wherein the reinforcing members comprise a different polymeric material or the same polymeric material as the first portion and the second portion and wherein the first polymeric material comprises polycarbonate, polyamide, polyphenylene ether, polybutylene terephthalate, polyethylene terephthalate, and combinations including at least one of the foregoing and wherein the second polymeric material comprises a reinforced polymeric material.

13. A rail extension comprising:
a base extending from one end of the rail extension, wherein the base includes vehicle rail attachments configured to attach to a vehicle rail;
a front member configured for attachment to a bumper beam;
a body extending from the base and toward the front member, wherein the base comprises cells formed by cell walls extending along at least a portion of a length of the body from the base toward the front member and forming cavities therethrough;
open channels formed on each side of the body, wherein the open channels are defined by walls of adjacent cells;
wherein the front member comprises a plurality of beam attachments that extend from the front member to the base;
beam attachment inserts located within the beam attachments; and wherein a cross-sectional area of a cell varies from the front member to the base and wherein a thickness of at least a portion of the cell wall varies from the front member to the base.

14. A rail extension comprising:
a base extending from one end of the rail extension, wherein the base includes vehicle rail attachments configured to attach to a vehicle rail;
a front member configured for attachment to a bumper beam;
a body extending from the base and toward the front member, wherein the base comprises cells formed by cell walls extending along at least a portion of a length of the body from the base toward the front member and forming cavities therethrough;
open channels formed on each side of the body, wherein the open channels are defined by walls of adjacent cells;
wherein the front member comprises a plurality of beam attachments that extend from the front member to the base;
beam attachment inserts located within the beam attachments; and
wherein the body comprises a crush initiator and wherein the body increases in cross-sectional area in a stepped geometry from the front member to the base.

* * * * *